(12) United States Patent
Winter et al.

(10) Patent No.: US 8,202,641 B2
(45) Date of Patent: Jun. 19, 2012

(54) METAL ELECTRODE ASSEMBLY FOR FLOW BATTERIES

(75) Inventors: Rick Winter, Orinda, CA (US); Brad Kell, Pembroke, MA (US); Jonathan Hall, San Mateo, CA (US); Gerardo Jose la O', Alameda, CA (US); Thomas Stepien, Portola Valley, CA (US)

(73) Assignee: Primus Power Corporation, Hayward, CA (US)

( * ) Notice: Subject to any disclaimer, the term of this patent is extended or adjusted under 35 U.S.C. 154(b) by 0 days.

(21) Appl. No.: 12/877,884

(22) Filed: Sep. 8, 2010

(65) Prior Publication Data

US 2011/0223451 A1    Sep. 15, 2011

(51) Int. Cl.
*H01M 2/38* (2006.01)
*H01M 4/00* (2006.01)
*H01M 10/02* (2006.01)
*H01M 4/58* (2010.01)
*H01M 2/36* (2006.01)

(52) U.S. Cl. .......... 429/80; 429/246; 429/152; 429/229; 429/231.5; 429/72

(58) Field of Classification Search .............. 429/80
See application file for complete search history.

(56) References Cited

U.S. PATENT DOCUMENTS

| 3,644,190 A | 2/1972 | Weist et al. |
|---|---|---|
| 3,713,888 A | 1/1973 | Symons |
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A * | 1/1978 | Carr .............................. 429/447 |
| 4,071,660 A | 1/1978 | Hart |
| 4,072,540 A | 2/1978 | Symons et al. |
| 4,078,987 A * | 3/1978 | Specht .......................... 204/266 |
| 4,086,393 A | 4/1978 | Hart |
| 4,100,332 A | 7/1978 | Carr |

(Continued)

FOREIGN PATENT DOCUMENTS

JP          63-314782 A    12/1988

(Continued)

OTHER PUBLICATIONS

U.S. Appl. No. 12/877,852, filed Sep. 8, 2010, Kell et al.

(Continued)

*Primary Examiner* — Patrick Ryan
*Assistant Examiner* — Brent Thomas
(74) *Attorney, Agent, or Firm* — The Marbury Law Group PLLC

(57) ABSTRACT

A flow battery electrode assembly with a first impermeable, substantially metal electrode, a second permeable, substantially metal electrode and at least one electrically conductive spacer. The electrically conductive spacer connects the first impermeable, substantially metal electrode and the second permeable, substantially metal electrode such that the first impermeable, substantially metal electrode and the second permeable, substantially metal electrode are spaced apart from each other by an electrolyte flow path.

27 Claims, 13 Drawing Sheets

U.S. PATENT DOCUMENTS

| | | | |
|---|---|---|---|
| 4,115,529 A | | 9/1978 | Behling |
| 4,127,701 A | | 11/1978 | Symons et al. |
| 4,146,680 A | | 3/1979 | Carr et al. |
| 4,162,351 A | | 7/1979 | Putt et al. |
| 4,200,684 A | | 4/1980 | Bro |
| 4,257,867 A | | 3/1981 | Hammond et al. |
| 4,273,839 A | | 6/1981 | Carr et al. |
| 4,287,267 A | | 9/1981 | Whittlesey et al. |
| 4,306,003 A | | 12/1981 | Henriksen |
| 4,307,159 A | | 12/1981 | Hammond et al. |
| 4,320,179 A | | 3/1982 | Hart |
| 4,371,825 A | | 2/1983 | Chi et al. |
| 4,413,042 A | | 11/1983 | Carr |
| 4,414,292 A | | 11/1983 | Kiwalle et al. |
| 4,415,847 A | | 11/1983 | Galloway |
| 4,518,663 A | * | 5/1985 | Kodali et al. .......... 429/51 |
| 4,518,664 A | | 5/1985 | Whittlesey et al. |
| 4,534,833 A | | 8/1985 | Carr et al. |
| 4,567,120 A | | 1/1986 | Jorne et al. |
| 4,678,656 A | | 7/1987 | Bjorkman, Jr. et al. |
| 4,728,587 A | | 3/1988 | Horie et al. |
| 4,746,585 A | | 5/1988 | Stoner et al. |
| 2001/0055713 A1 | * | 12/2001 | Eidler et al. .......... 429/81 |
| 2004/0234843 A1 | | 11/2004 | Skyllas-Kazacos |
| 2005/0181273 A1 | | 8/2005 | Deguchi et al. |
| 2005/0244707 A1 | | 11/2005 | Skyllas-Kazacos |
| 2005/0260473 A1 | * | 11/2005 | Wang .......... 429/33 |
| 2008/0152990 A1 | * | 6/2008 | Ibuka et al. .......... 429/34 |
| 2009/0239131 A1 | | 9/2009 | Winter |
| 2010/0021805 A1 | | 1/2010 | Winter |
| 2010/0119937 A1 | | 5/2010 | Winter |
| 2010/0323264 A1 | * | 12/2010 | Chiang et al. .......... 429/449 |
| 2011/0070468 A9 | | 3/2011 | Winter |

FOREIGN PATENT DOCUMENTS

| | | |
|---|---|---|
| JP | 02-010671 A | 1/1990 |
| WO | WO 2008/089205 A2 | 7/2008 |
| WO | WO 2011/011533 A3 | 1/2011 |

OTHER PUBLICATIONS

Symons, Philip C., "Advanced Technology Zinc/Chlorine Batteries for Electric Utility Load Leveling," 19$^{th}$ Intersociety Energy Conversion Engineering Conf., 1984, vol. 2, 857-862.

EPRI Report, EM-1051 (parts 1-3), Apr. 1979, Electric Power Research Institute.

International Search Report and Written Opinion issued in PCT Application PCT/US2011/050089, mailed on Apr. 9, 2012.

* cited by examiner

Fig. 9a
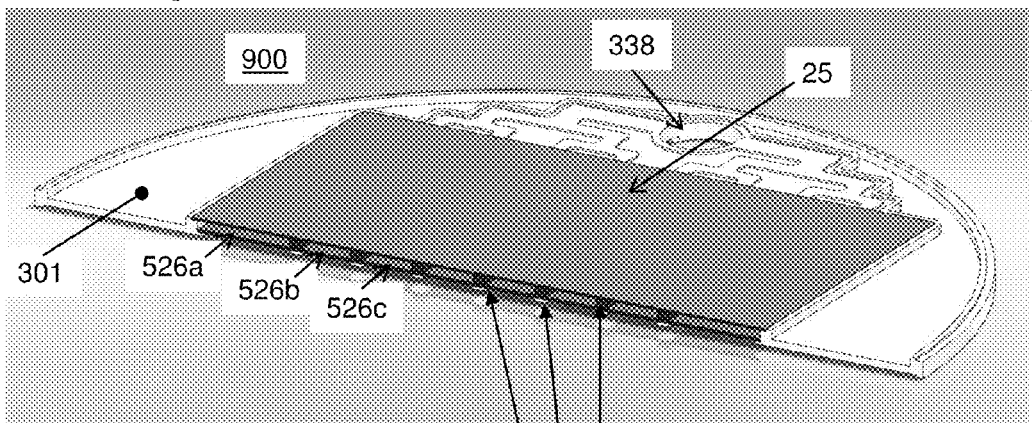
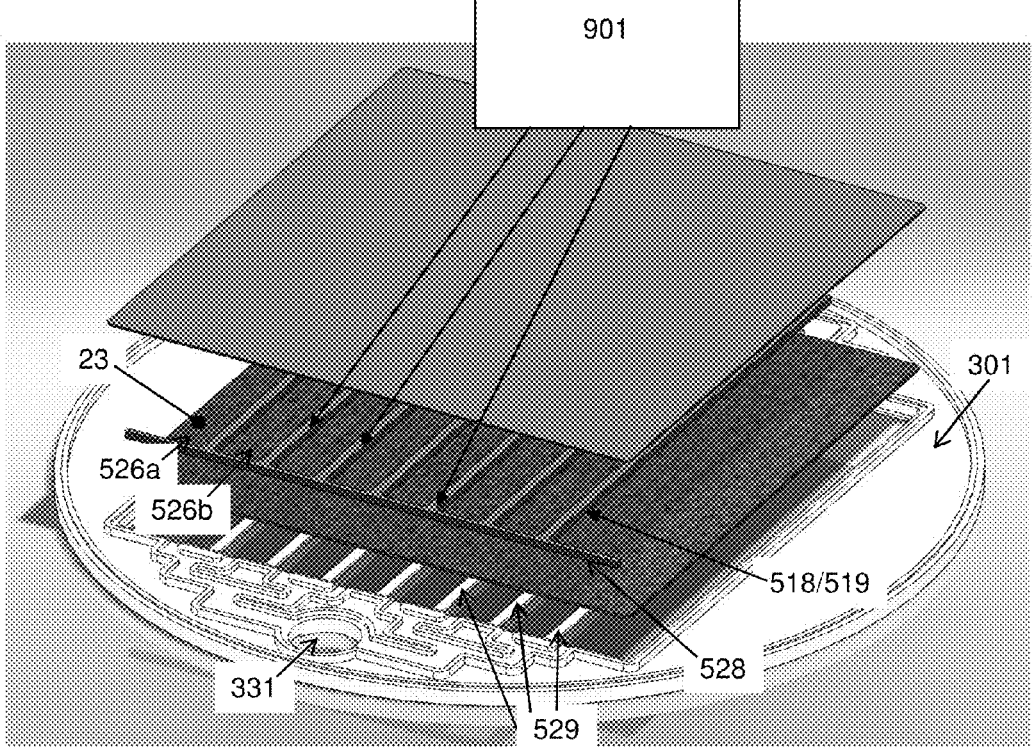
Fig. 9b

Fig. 11a
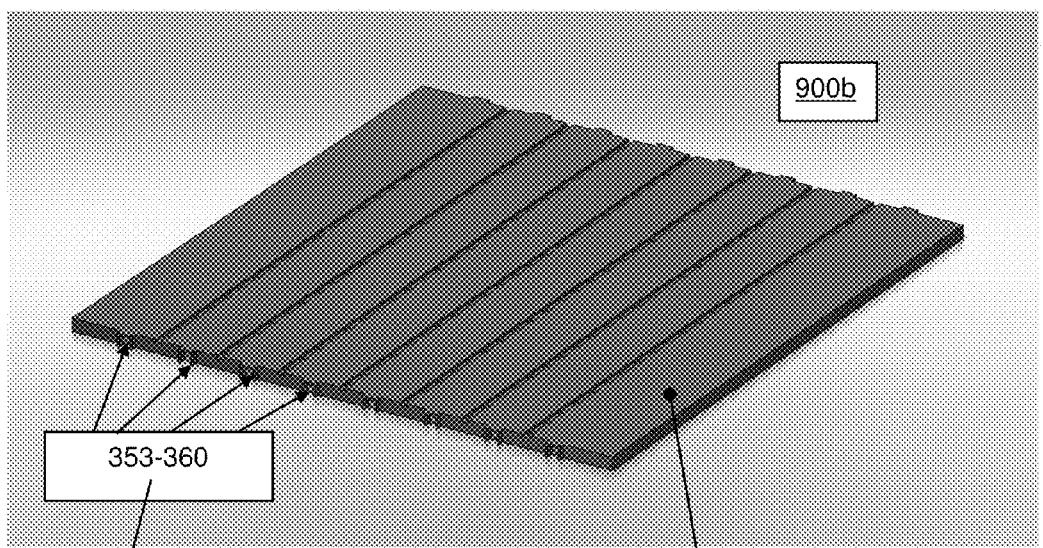
Fig. 11b
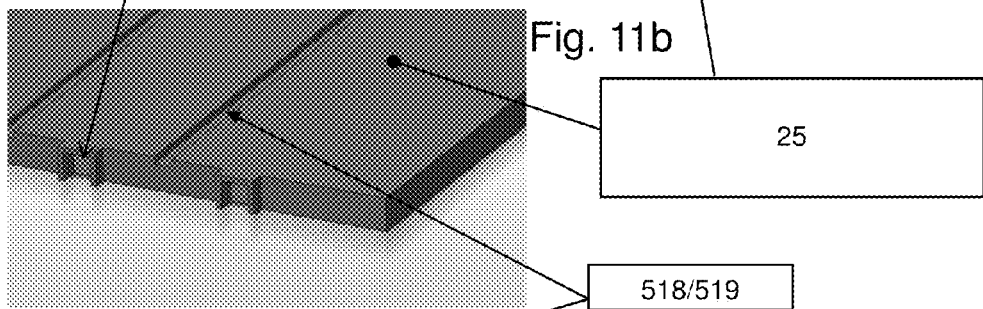
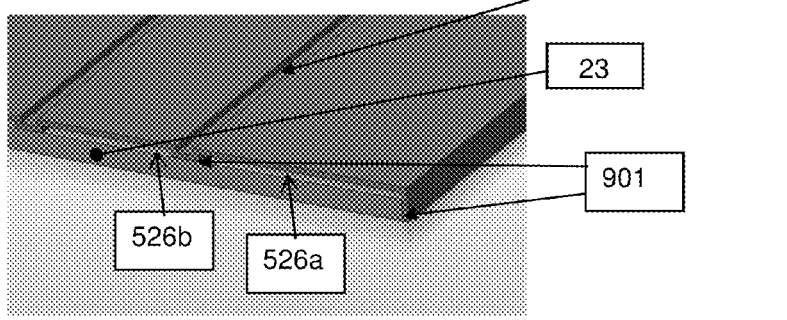
Fig. 11c

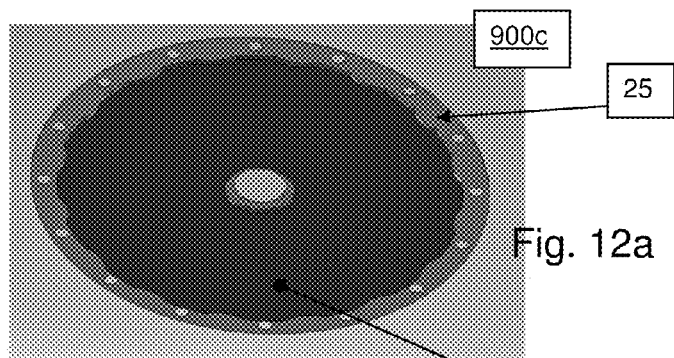
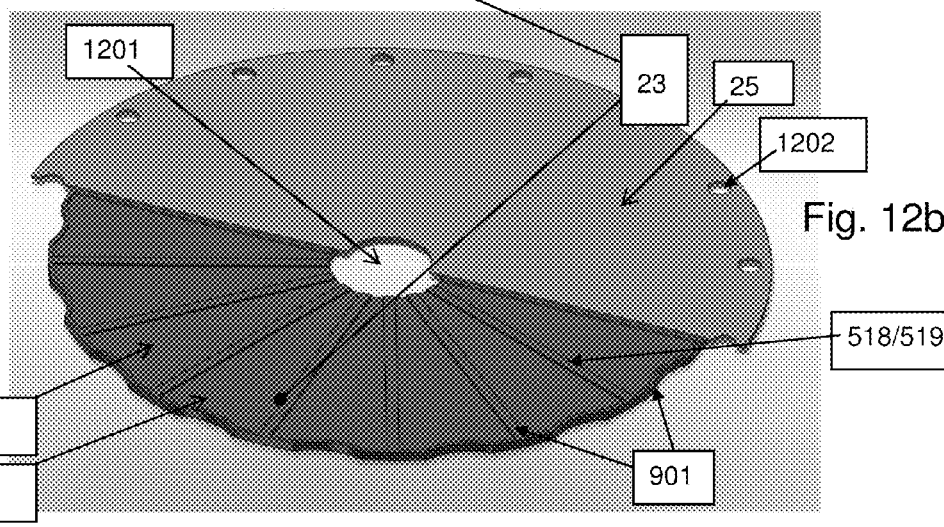
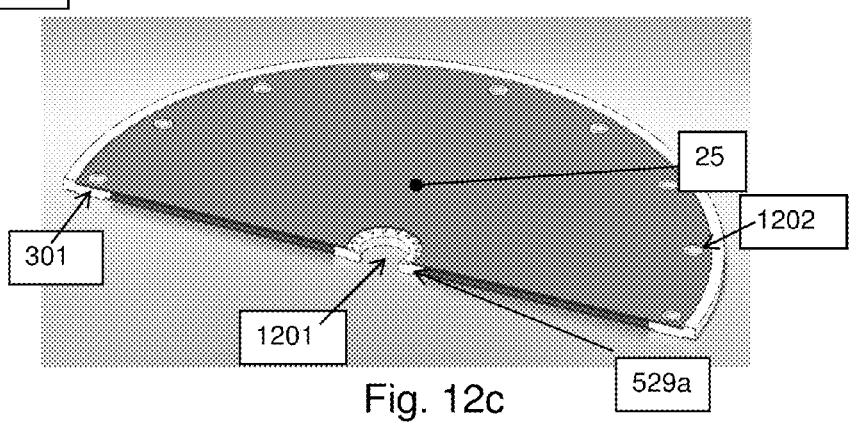
Fig. 12a
Fig. 12b
Fig. 12c

METAL ELECTRODE ASSEMBLY FOR FLOW BATTERIES

FIELD

The present invention is directed to electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, and in EPRI Report EM-1051 (Parts 1-3) dated April 1979, published by the Electric Power Research Institute, the disclosures of which are hereby incorporated by reference in their entirety.

SUMMARY

One embodiment relates to a flow battery electrode assembly with a first impermeable, substantially metal electrode, a second permeable, substantially metal electrode and at least one electrically conductive spacer. The electrically conductive spacer connects the first impermeable, substantially metal electrode and the second permeable, substantially metal electrode such that the first impermeable, substantially metal electrode and the second permeable, substantially metal electrode are spaced apart from each other by an electrolyte flow path.

Another embodiment relates to a flow battery with a pressure vessel with a stack of electrochemical cells comprising a plurality of the electrode assemblies discussed above located in the pressure vessel. The flow battery also includes a reservoir located in the pressure vessel. The reservoir may be configured to accumulate a metal-halide electrolyte component and a liquefied halogen reactant. The flow battery also includes a flow circuit located in the pressure vessel. The flow circuit may be configured to deliver the halogen reactant and the metal-halide electrolyte between the reservoir and the stack of electrochemical cells.

Another embodiment relates to a flow battery with a pressure vessel, a stack of electrochemical cells located in the pressure vessel and a reservoir located in the pressure vessel. The reservoir may be configured to accumulate a metal-halide electrolyte component and a liquefied halogen reactant. The flow battery also includes a flow circuit located in the pressure vessel. The flow circuit may be configured to deliver the halogen reactant and the metal-halide electrolyte between the reservoir and the stack of electrochemical cells. The stack of electrochemical cells includes a first electrochemical cell and an adjacent second electrochemical cell. Further, a cathode electrode of the first electrochemical cell comprises a first impermeable, substantially metal electrode. An anode electrode of the second electrochemical cell comprises a second permeable, substantially metal electrode. At least one electrically conductive spacer connects the cathode electrode of the first electrochemical cell to the anode electrode of the second electrochemical cell such that the cathode electrode of the first electrochemical cell and the anode electrode of the second electrochemical cell are spaced apart from each other by a flow path for the halogen reactant and the metal-halide electrolyte. An anode electrode of the first electrochemical cell is separated from the cathode electrode of the first electrochemical cell by a reaction zone of the first electrochemical cell. Additionally, a cathode electrode of the second electrochemical cell is separated from the anode electrode of the second electrochemical cell by a reaction zone of the second electrochemical cell.

BRIEF DESCRIPTION OF THE DRAWINGS

FIG. 9a illustrates a side cross section view of an embodiment of an electrode assembly.

FIG. 9b is an exploded view of the embodiment illustrate in FIG. 9a.

FIG. 10b illustrates a portion of a cross section of the electrode assembly of FIG. 10a.

FIG. 10c illustrates an exploded view of a portion of a cross section of the electrode assembly of FIG. 10a.

FIG. 11a is a perspective view of another embodiment of an electrode assembly.

FIG. 11b illustrates a perspective view of a portion of the electrode assembly of FIG. 11a.

FIG. 11c illustrates a side cross section view of the electrode assembly of FIG. 11a.

FIG. 12a is a perspective view illustrating another embodiment of an electrode assembly.

FIG. 12b is a cutaway view of the electrode assembly of FIG. 12a.

FIG. 12c illustrates a side cross sectional view of the electrode assembly of FIG. 12a.

DETAILED DESCRIPTION

The following documents, the disclosures of which are incorporated herein by reference in their entirety, can be useful for understanding and practicing the embodiments described herein: U.S. patent application Ser. No. 12/523,146, which is a U.S. National Phase entry of PCT application no. PCT/US2008/051111 filed Jan. 11, 2008, which claims benefit of priority to U.S. patent application Ser. No. 11/654,380 filed Jan. 16, 2007.

The embodiments disclosed herein relate to an electrochemical system (also sometimes referred to as a "flow battery"). The electrochemical system can utilize a metal-halide electrolyte and a halogen reactant, such as molecular chlorine. The halide in the metal-halide electrolyte and the halogen reactant can be of the same type. For example, when the halogen reactant is molecular chlorine, the metal halide electrolyte can contain at least one metal chloride.

The electrochemical system can include a sealed vessel containing an electrochemical cell in its inner volume, a metal-halide electrolyte and a halogen reactant, and a flow circuit configured to deliver the metal-halide electrolyte and the halogen reactant to the electrochemical cell. The sealed vessel can be a pressure vessel that contains the electrochemical cell. The halogen reactant can be, for example, a molecular chlorine reactant.

Figure 4:
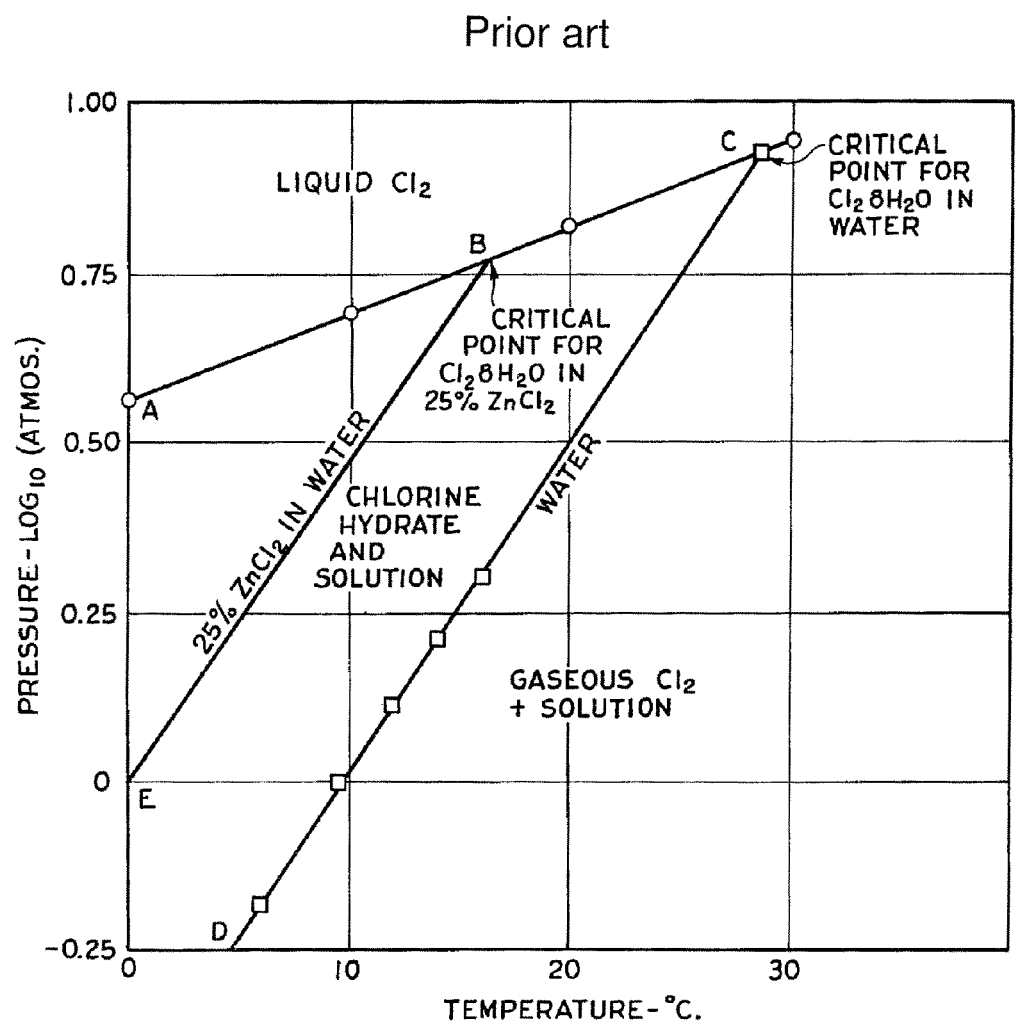
FIG. 4 is a prior art phase diagram for a molecular chlorine as presented in U.S. Pat. No. 3,940,283.

In many embodiments, the halogen reactant may be used in a liquefied form. The sealed vessel is such that it can maintain an inside pressure above a liquefication pressure for the halogen reactant at a given ambient temperature. A liquefication pressure for a particular halogen reactant for a given temperature may be determined from a phase diagram for the halogen reactant. For example, FIG. 4 presents a phase diagram for elemental chlorine, from which a liquefication pressure for a given temperature may be determined. The system that utilizes the liquefied halogen reactant in the sealed container does not require a compressor, while compressors are often used in other electrochemical systems for compression of gaseous halogen reactants. The system that utilizes the liquefied halogen reactant does not require a separate storage for the halogen reactant, which can be located outside the inner volume of the sealed vessel. The term "liquefied halogen reactant" refers to at least one of molecular halogen dissolved in water, which is also known as wet halogen or aqueous halogen, and "dry" liquid molecular halogen, which is not dissolved in water. Similarly, the term "liquefied chlorine" may refer to at least one of molecular chlorine dissolved in water, which is also known as wet chlorine or aqueous chlorine, and "dry" liquid chlorine, which is not dissolved in water.

In many embodiments, the system utilizes a liquefied molecular chlorine as a halogen reactant. The liquefied molecular chlorine has a gravity which is approximately two times greater than that of water.

The flow circuit contained in the sealed container may be a closed loop circuit that is configured to deliver the halogen reactant, preferably in the liquefied or liquid state, and the at least one electrolyte to and from the cell(s). In many embodiments, the loop circuit may be a sealed loop circuit. Although the components, such as the halogen reactant and the metal halide electrolyte, circulated through the closed loop are preferably in a liquefied state, the closed loop may contain therein some amount of gas, such as chlorine gas.

Preferably, the loop circuit is such that the metal halide electrolyte and the halogen reactant circulate through the same flow path without a separation in the cell(s).

Each of the electrochemical cell(s) may comprise a first electrode, which may serve as a positive electrode in a normal discharge mode, and a second electrode, which may serve as a negative electrode in a normal discharge mode, and a reaction zone between the electrodes.

In many embodiments, the reaction zone may be such that no separation of the halogen reactant, such as the halogen reactant or ionized halogen reactant dissolved in water of the electrolyte solution, occurs in the reaction zone. For example, when the halogen reactant is a liquefied chlorine reactant, the reaction zone can be such that no separation of the chlorine reactant, such as the chlorine reactant or chlorine ions dissolved in water of the electrolyte solution, occurs in the reaction zone. The reaction zone may be such that it does not contain a membrane or a separator between the positive and negative electrodes of the same cell that is impermeable to the halogen reactant, such as the halogen reactant or ionized halogen reactant dissolved in water of the electrolyte solution. For example, the reaction zone may be such that it does not contain a membrane or a separator between the positive and negative electrodes of the same cell that is impermeable to the liquefied chlorine reactant, such as the chlorine reactant or chlorine ions dissolved in water of the electrolyte solution.

In many embodiments, the reaction zone may be such that no separation of halogen ions, such as halogen ions formed by reducing the halogen reactant at one of the electrodes, from the rest of the flow occurs in the reaction zone. In other words, the reaction zone may be such that it does not contain a membrane or a separator between the positive and negative electrodes of the same cell that is impermeable for the halogen ions, such as chlorine ions. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane.

In certain embodiments, the first electrode may be a porous electrode or contain at least one porous element. For example, the first electrode may comprise a porous or a permeable metal electrode as will be described in more detail below. In a discharge mode, the first electrode may serve as a positive electrode, at which the halogen may be reduced into halogen ions. The use of the porous material in the first electrode may increase efficiency of the halogen reactant's reduction.

In many embodiments, the second electrode may comprise an oxidizable metal, i.e., a metal that may be oxidized to form cations during the discharge mode. In many embodiments, the second electrode may comprise a metal that is of the same type as a metal ion in one of the components of the metal halide electrolyte. For example, when the metal halide electrolyte comprises zinc halide, such as zinc chloride, the second electrode may comprise metallic zinc. Alternatively, the electrode may comprise another material, such as ruthenized titanium (i.e., ruthenium coated titanium, where the ruthenium is oxidized to form ruthenium oxide) that is plated with zinc. In such a case, the electrochemical system may function as a reversible system.

Thus, in some embodiments, the electrochemical system may be reversible, i.e. capable of working in both charge and discharge operation mode; or non-reversible, i.e. capable of working only in a discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. On the other hand, the non-reversible electrochemical system does not utilize the metal halides that satisfy the above requirements. Metals of metal halides that are used in the non-reversible systems are usually unstable and strong in their reduced, elemental form to be able to form an electrode. Examples of such unstable metals and their corresponding metal halides include potassium (K) and potassium halides and sodium (Na) and sodium halides.

The metal halide electrolyte can be an aqueous electrolytic solution. The electrolyte may be an aqueous solution of at least one metal halide electrolyte compound, such as ZnCl. For example, the solution may be a 15-50% aqueous solution of ZnCl, such as a 25% solution of ZnCl. In certain embodiments, the electrolyte may contain one or more additives, which can enhance the electrical conductivity of the electrolytic solution. For example, when the electrolyte contains ZnCl, such additive can be one or more salts of sodium or potassium, such as NaCl or KCl.

Figure 1:
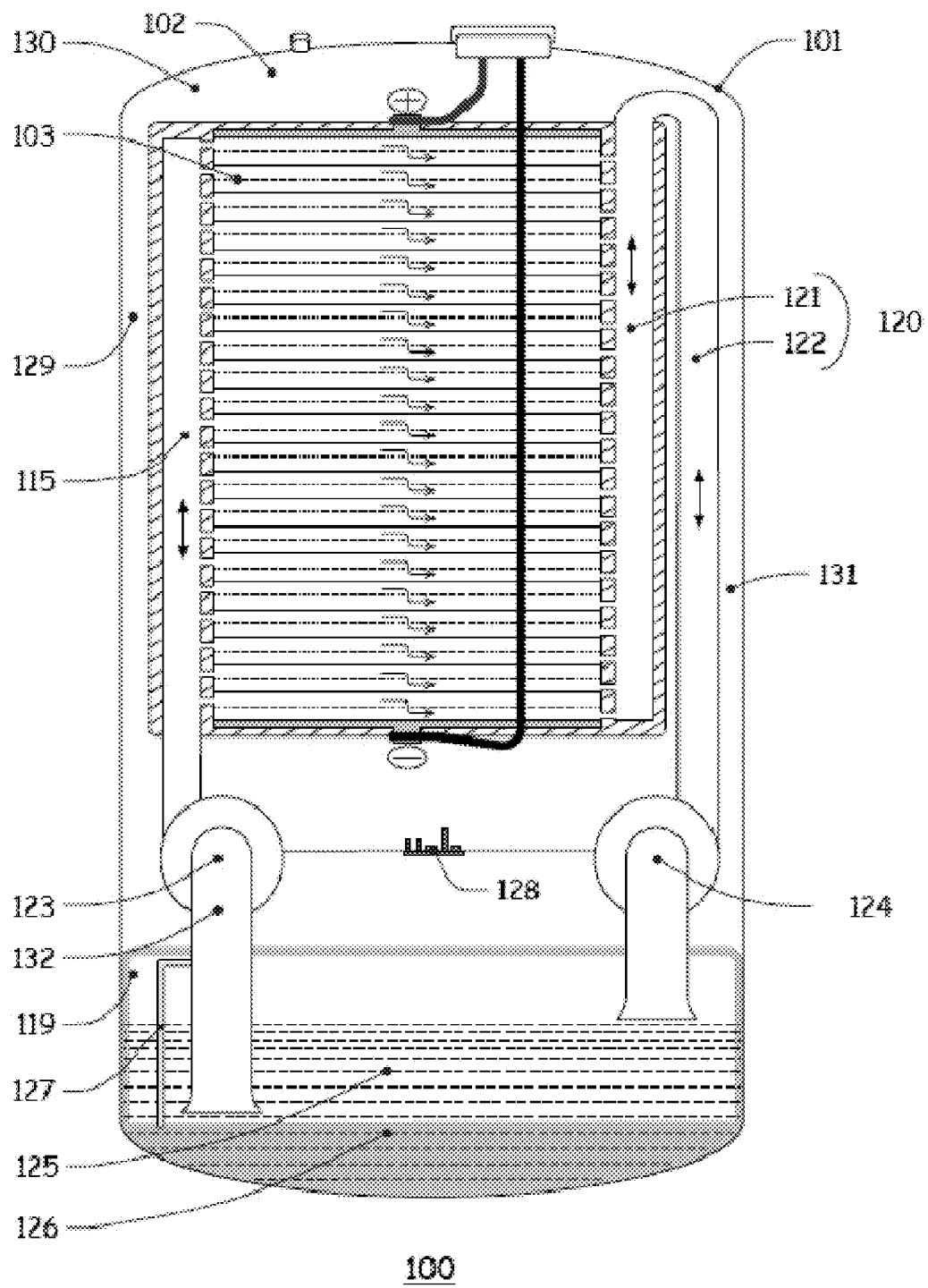
FIG. 1 illustrates a side cross section view of an embodiment of the electrochemical system with a sealed container containing a stack of electrochemical cells.

FIG. 1 illustrates an electrochemical system 100 which includes at least one electrochemical cell, an electrolyte and a halogen reactant contained in a sealed container 101. The sealed container 101 is preferably a pressure containment vessel, which is configured to maintain a pressure above one atmospheric pressure in its inner volume 102. Preferably, the sealed container 101 is configured to maintain a pressure in its inner volume above the liquefication pressure for the halogen reactant, such as elemental chlorine. For functioning at a normal temperature such as 10-40° C., the sealed container may be configured to maintain an inside pressure of at least 75 psi or of at least 100 psi or of at least 125 psi or of at least 150 psi or of at least 175 psi or of at least 200 psi or of at least 250 psi or of at least 300 psi or of at least 350 psi or of at least 400 psi or of at least 450 psi or of at least 500 psi or of at least 550 psi or of at least 600 psi, such as 75-650 psi or 75-400 psi and all subranges described previously. The walls of the sealed container may be composed of a structural material capable to withstand the required pressure. One non-limiting example of such a material is stainless steel.

The at least one electrochemical cell contained inside the sealed container 101 is preferably a horizontally positioned cell, which may include a horizontal positive electrode and horizontal negative electrode separated by a gap. The horizontally positioned cell may be advantageous because when the circulation of the liquid stops due to, for example, turning off a discharge or a charge pump, some amount of liquid (the electrolyte and/or the halogen reactant) may remain in the reaction zone of the cell. The amount of the liquid may be such that it provides electrical contact between the positive and negative electrodes of the same cell. The presence of the liquid in the reaction zone may allow a faster restart of the electrochemical system when the circulation of the metal halide electrolyte and the halogen reagent is restored compared to systems that utilize a vertically positioned cell(s), while providing for shunt interruption. The presence of the electrolyte in the reaction zone may allow for the cell to hold a charge in the absence of the circulation and thus, ensure that the system provides uninterrupted power supply (UPS). The horizontally positioned cell(s) in a combination with a liquefied chlorine reactant used as a halogen reactant may also prevent or reduce a formation of chlorine bubbles during the operation.

In many embodiments, the sealed container may contain more than one electrochemical cell. In certain embodiments, the sealed container may contain a plurality of electrochemical cells, which may be connected in series. In some embodiments, the plurality of electrochemical cells that are connected in series may be arranged in a stack. For example, element 103 in FIG. 1 represents a vertical stack of horizontally positioned electrochemical cells, which are connected in series. The stack of horizontally positioned cells may be similar to the one disclosed on pages 7-11 and FIGS. 1-3 of WO2008/089205, which is incorporated herein by reference in its entirety. The advantages of a single horizontally positioned cell apply to the stack as well.

The electrochemical system can include a feed pipe or manifold that may be configured in a normal discharge operation mode to deliver a mixture comprising the metal-halide electrolyte and the liquefied halogen reactant to the at least one cell. The electrochemical system may also include a return pipe or manifold that may be configured in the discharge mode to collect products of an electrochemical reaction from the at least one electrochemical cell. Such products may be a mixture comprising the metal-halide electrolyte and/or the liquefied halogen reactant, although the concentration of the halogen reactant in the mixture may be reduced compared to the mixture entering the cell due to the consumption of the halogen reactant in the discharge mode.

For example, in FIG. 1 a feed pipe or manifold 115 is configured to deliver a mixture comprising the metal-halide electrolyte and the liquefied halogen reactant to the horizontally positioned cells of the stack 103. A return pipe or manifold 120 is configured to collect products of an electrochemical reaction from cells of the stack. As will be further discussed, in some embodiments, the feed pipe or manifold and/or the return pipe or manifold may be a part of a stack assembly for the stack of the horizontally positioned cells. In some embodiments, the stack 103 may be supported directly by walls of the vessel 101. Yet in some embodiments, the stack 103 may be supported by one or more pipes, pillars or strings connected to walls of the vessel 101 and/or reservoir 119.

The feed pipe or manifold and the return pipe or manifold may be connected to a reservoir 119 that may contain the liquefied, e.g. liquid, halogen reactant and/or the metal halide reactant. Such a reservoir may be located within the sealed container 101. The reservoir, the feed pipe or manifold, the return pipe or manifold and the at least one cell may form a loop circuit for circulating the metal-halide electrolyte and the liquefied halogen reactant.

The metal-halide electrolyte and the liquefied halogen reactant may flow through the loop circuit in opposite directions in charge and discharge modes. In the discharge mode, the feed pipe or manifold 115 may be used for delivering the metal-halide electrolyte and the liquefied halogen reactant to the at least one cell 103 from the reservoir 119 and the return pipe or manifold 120 for delivering the metal-halide electrolyte and the liquefied halogen reactant from the at least one cell back to the reservoir. In the charge mode, the return pipe or manifold 120 may be used for delivering the metal-halide electrolyte and/or the liquefied halogen reactant to the at least one cell 103 from the reservoir 119 and the feed pipe or manifold 115 for delivering the metal-halide electrolyte and/or the liquefied halogen reactant from the at least one cell 103 back to the reservoir 119.

In some embodiments, when the system utilizes a vertical stack of horizontally positioned cells, the return pipe or manifold 120 may be an upward-flowing return pipe or manifold. The pipe 120 includes an upward running section 121 and a downward running section 122. The flow of the metal-halide electrolyte and the liquefied halogen electrolyte leaves the cells of the stack 103 in the discharge mode upward through the section 121 and then goes downward to the reservoir through the section 122. The upward flowing return pipe or manifold may prevent the flow from going mostly through the bottom cell of the stack 103, thereby, providing a more uniform flow path resistance between the cells of the stack.

The electrochemical system may include one or more pumps for pumping the metal-halide electrolyte and the liquefied halogen reactant. Such a pump may or may not be located within the inner volume of the sealed vessel. For example, FIG. 1 shows discharge pump 123, which fluidly connects the reservoir 119 and the feed pipe or manifold 115 and which is configured to deliver the metal-halide electrolyte and the liquefied halogen reactant through the feed pipe or manifold 115 to the electrochemical cell(s) 103 in the discharge mode. In some embodiments, the electrochemical generation system may include charge pump depicted as element 124 in FIG. 1. The charge pump fluidly connects the return pipe or manifold 120 to the reservoir 119 and can be used to deliver the metal-halide electrolyte and the liquefied halogen reactant through the return pipe or manifold to the electrochemical cell(s) in the charge mode. In some embodiments, the electrochemical system may include both charge and discharge pumps. The charge and discharge pumps may be configured to pump the metal-halide electrolyte and the liquefied halogen reactant in the opposite directions through the loop circuit that includes the feed pipe or manifold and the return pump or manifold. Preferably, the charge and discharge pumps are configured in such a way so that only one pump operates at a given time. Such an arrangement may improve the reliability of the system and increase the lifetime of the system. The opposite pump arrangement may also allow one not to use in the system a valve for switching between the charge and discharge modes. Such a switch valve may often cost more than an additional pump. Thus, the opposite pump arrangement may reduce the overall cost of the system.

Pumps that are used in the system may be centripetal pumps. In some embodiments, it may be preferred to use a pump that is capable to provide a pumping rate of at least 30 L/min.

FIG. 1 depicts the reservoir as element 119. The reservoir 119 may be made of a material that is inert to the halogen reactant. One non-limiting example of such an inert material may be a polymer material, such as polyvinyl chloride (PVC). The reservoir 119 may also store the metal halide electrolyte. In such a case, if the liquefied chlorine is used as a liquefied halogen reactant, then the chlorine can be separated from the metal halide electrolyte due to a higher density (specific gravity) of the former, and/or by a separation device as described below with respect to FIGS. 7 and 8. FIG. 1 shows liquefied chlorine at the lower part of the reservoir (element 126) and the metal-halide electrolyte being above the liquefied chlorine in the reservoir (element 125).

The reservoir 119 may contain a feed line for the liquefied halogen reactant, which may supply the halogen reactant 126 to the feed pipe or manifold 115 of the system. A connection between the halogen reactant feed line and the feed manifold of the system may occur before, at or after a discharge pump 123. In some embodiments, the connection between the halogen reactant feed line and the feed manifold of the system may comprise a mixing venturi. FIG. 1 presents the feed line for the liquefied halogen reactant as element 127. An inlet of the feed line 127, such as a pipe or conduit, may extend to the lower part 126 of the reservoir 119, where the liquefied halogen reactant, such as the liquefied chlorine reactant, may be stored. An outlet of the feed line 127 is connected to an inlet of the discharge pump 123. The electrolyte intake feed line, such as a pipe or conduit 132, may extend to the upper part 125, where the metal-halide electrolyte is located.

In some embodiments, the reservoir 119 may include one or more sump plates, which may be, for example, a horizontal plate with holes in it. The sump plate may facilitate the settling down of the liquefied halogen reactant, such as liquefied chlorine reactant, at the lower part 126 of the reservoir, when the liquefied halogen reactant returns to the reservoir 119, for example, from the return pipe or manifold 120 in the discharge mode. The reservoir 119 is preferably but not necessarily located below the stack of cells 103.

In some embodiments, the reservoir 119 may include one or more baffle plates. Such baffle plates may be vertical plates located at the top and bottom of the reservoir. The baffle plates may reduce and/or prevent eddy currents in the returning flow of the metal-halide electrolyte and the liquefied halogen reactant, thereby enhancing the separation of the liquefied halogen from the metal-halide electrolyte in the reservoir.

In certain embodiments, the discharge pump may be positioned with respect to the reservoir so that it's inlet/outlet is located below the upper level of the metal-halide electrolyte in the reservoir. In certain embodiments, the inlet/outlet of the discharge pump may be positioned horizontally or essentially horizontally. In such an arrangement, the flow of the metal-halide electrolyte and the liquefied halogen reactant may make a 90 degree turn in the discharge pump from a horizontal direction in the inlet to a vertical direction in the feed manifold or pipe 115. In some embodiments, the inlet of the discharge pump 123 may include a bellmouth piece, which may slow down the flow and thereby prevent/reduce formation of turbulence in the reservoir.

The charge pump may also be positioned with it's inlet/outlet located below the upper level of the metal-halide electrolyte in the reservoir. In certain embodiments, the inlet/outlet of the charge pump may be located at a lower level than the inlet/outlet of the discharge pump. The inlet/outlet of the charge pump may also have a bellmouth piece, which may slow down the flow and thereby prevent/reduce formation of turbulence in the reservoir.

Figure 6:
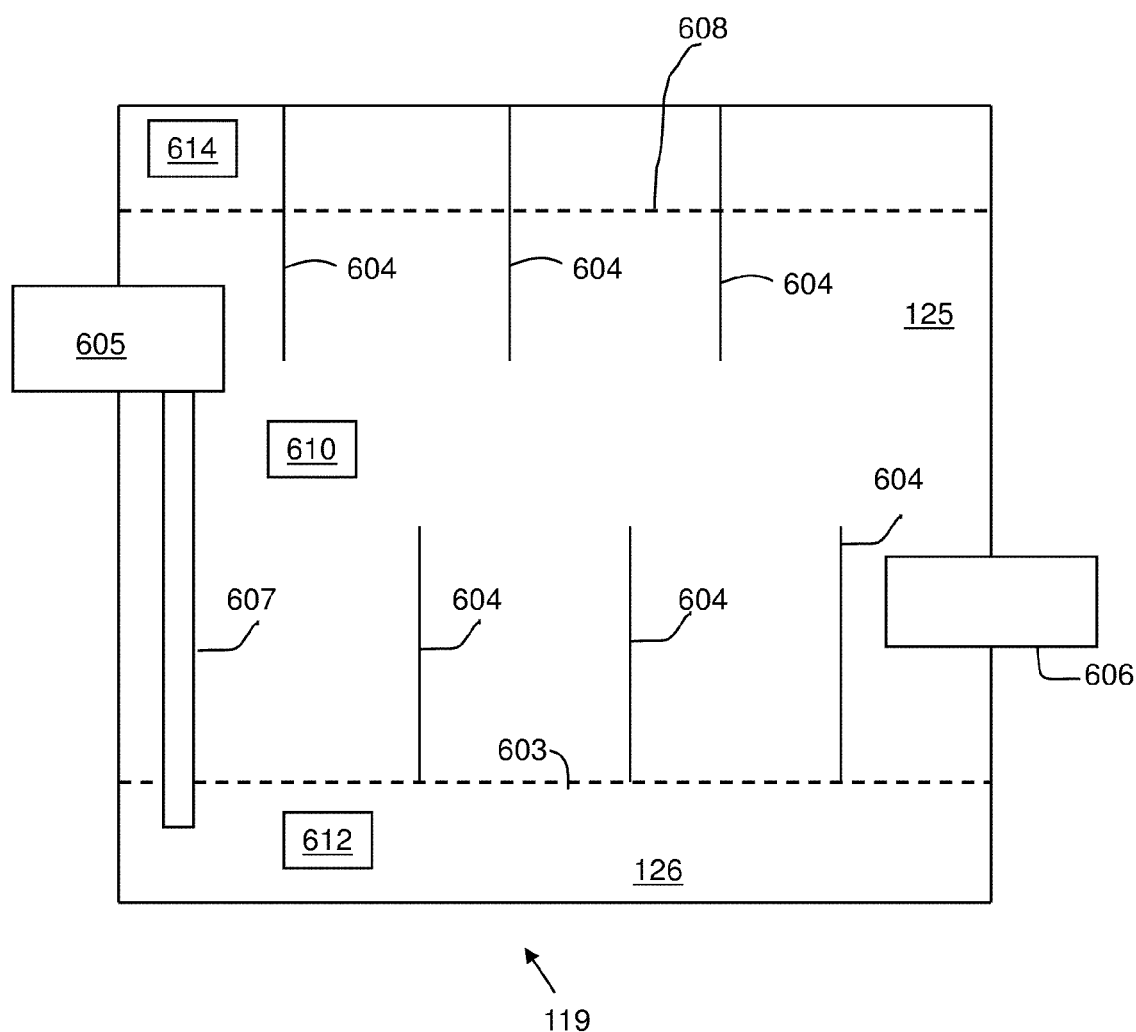
FIG. 6 schematically illustrates a side cross-sectional view of a reservoir which has a sump plate separation device and baffle plates.

FIG. 6 illustrates the reservoir 119 which has a lower part 126, which may contain the liquefied halogen reactant, such as a liquefied molecular chlorine reactant; an upper part 125, which may contain the metal halide reactant; a horizontal sump plate 603, vertical baffle plates 604, a horizontal inlet 605 of a discharge pump, a horizontal outlet 606 of a charge pump and a feed line 607 for the liquefied halogen reactant, which has an inlet in the lower part 126 of the reservoir and which is connected to the discharge pump's inlet 605. The sump plate 603 is positioned approximately at the level where the boundary between the metal-halide electrolyte and the halogen reactant is expected to be located. Line 608 schematically depicts the upper level of the metal-halide electrolyte in the reservoir. Discharge pump's inlet 605 and charge pump's outlet 606 may protrude through the walls of the reservoir.

In some embodiments, the electrochemical system may include a controlling element, which may be used, for example, for controlling a rate of the discharge pump, a rate of the charge pump and/or a rate of feeding the halogen reactant into the electrolyte. Such a controlling element may be an analog circuit. FIG. 1 depicts the controlling element as element 128, which may control one or more of the following parameters: rates of the charge pump 124 and the discharge pump 123 and a feed rate of the liquefied chlorine reactant through the feed line 127.

The inner volume of the sealed container may have several pressurized zones, each having a different pressure. For example, the inner volume may include a first zone, and a second zone having a pressure higher than that of the first zone. In some embodiments, the first zone may be enveloped or surrounded by the second, higher pressure zone. The first zone may contain the electrolyte/liquefied halogen reactant loop, i.e. the reservoir 119, the cell(s) 103, pump(s) 123 and 124, manifold(s) 115, 120, while the second surrounding or enveloping zone may be a space between the first zone and the walls of the sealed vessel 101. In FIG. 1, the cells 103, the feed manifold or pipe 115, the reservoir 119, including the metal halide reactant in the upper part 125 of the reservoir and the liquefied halogen reactant in its lower part 126, and the return manifold or pipe 120 all may be in the first pressure zone, while the higher pressure second zone may be represented by the areas 129, 130 and 131 of the inner volume of the vessel 101.

In such an arrangement, a pressure in the first zone may be a pressure sufficient to liquefy the halogen reactant at a given temperature. Such a pressure may be at least 75 psi or at least 100 psi or at least 125 psi or at least 150 psi or at least 175 psi or at least 200 psi or at least 250 psi or at least 300 psi or at least 350 psi or at least 400 psi, such as 75-450 psi or 75-400 psi and all subranges in between. At the same time, a surrounding pressure in the second pressure zone may be higher than a maximum operating pressure of the first zone. Such a surrounding pressure may be at least 75 psi or at least 100 psi or at least 125 psi or at least 150 psi or at least 175 psi or at least 200 psi or at least 250 psi or at least 300 psi or at least 350 psi or at least 400 psi or at least 450 psi or at least 500 psi or at least 550 psi or at least 600 psi, such as 75-650 psi or 200-650 psi or 400-650 psi and all the subranges in between.

The enveloped arrangement may provide a number of advantages. For example, in the event of a leak from the first zone/loop circuit, the higher pressure in the surrounding second zone may cause the leaking component(s) to flow inwards the first zone, instead of outwards. Also, the surrounding higher pressure zone may reduce/prevent fatigue crack propagation over components of the first zone/loop circuit, including components made of plastic, such as manifolds and walls of reservoir. The pressurized envelope arrangement may also allow using thinner outer wall(s) for the sealed container/vessel, which can, nevertheless, prevent deformation(s) that could negatively impact internal flow geometries for the metal-halide electrolyte and the liquefied halogen reactant. In the absence of the pressurizing second zone, thicker outer wall(s) may be required to prevent such deformation(s) due to an unsupported structure against expansive force of the internal higher pressure.

In certain embodiments, the outer walls of the sealed container/vessel may be formed by a cylindrical component and two circular end plates, one of which may be placed on the top of the cylindrical component and the other on the bottom in order to seal the vessel. The use of the pressurized envelope arrangement for such outer walls allows using thinner end plates, without exposing internal flow geometries for the metal-halide electrolyte and the liquefied halogen reactant compared to the case when the outer walls are exposed to the variable pressure generated during the operation of the system.

The second pressure zone may be filled with an inert gas, such as argon or nitrogen. In some embodiments, the second pressure zone may also contain an additional component that can neutralize a reagent, such as the halogen reactant, that is leaking from the first zone, and/or to heal walls of the first zone/loop circuit. Such an additional material may be, for example, a soda ash. Thus, spaces 129, 130 and 131 may be filled with soda ash.

The electrochemical system in a pressurized envelope arrangement may be fabricated as follows. First, a sealed loop circuit for the metal halide electrolyte and the liquefied halogen reagent may be fabricated. The sealed loop circuit can be such that it is capable to maintain an inner pressure above a liquefication pressure of the liquefied halogen for a given temperature. The sealed loop circuit may include one or more of the following elements: one or more electrochemical cells, a reservoir for storing the metal-halide electrolyte and the liquefied halogen reactant; a feed manifold or pipe for delivering the metal-halide electrolyte and the liquefied halogen reactant from the reservoir to the one or more cells; a return manifold for delivering the metal-halide electrolyte and the liquefied halogen reactant from the one or more cells back to the reservoir; and one or more pumps. After the loop circuit is fabricated, it may be placed inside a vessel or container, which may be later pressurized to a pressure, which is higher than a maximum operation pressure for a loop circuit, and sealed. The pressurization of the vessel may be performed by pumping in an inert gas, such as argon or nitrogen, and optionally, one or more additional components. When the walls of the vessel are formed by a cylindrical component and two end plates, the sealing procedure may include the end plates at the top and the bottom of the cylindrical component.

Figure 2:
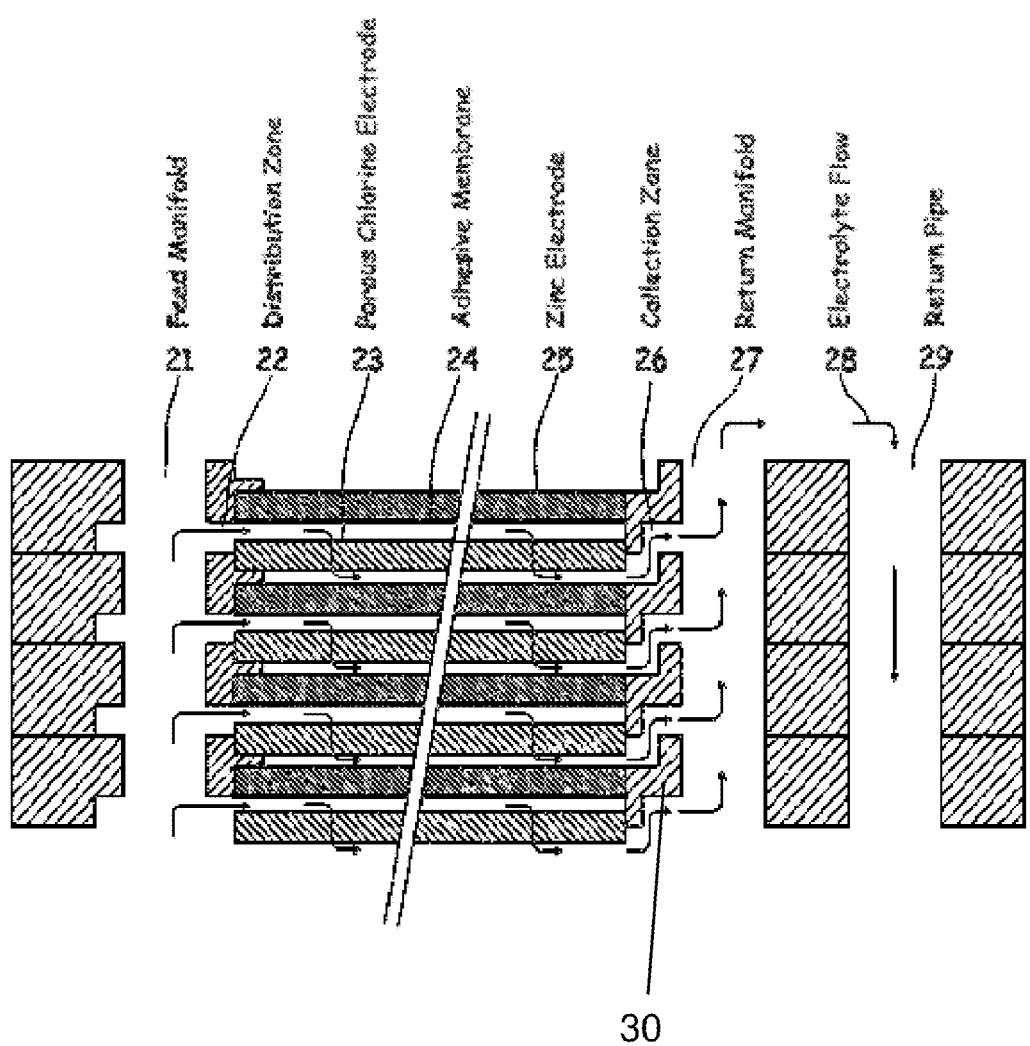
FIG. 2 illustrates a side cross section view of flow paths in a stack of horizontally positioned cells.

FIG. 2 illustrates paths for a flow of the metal-halide electrolyte and the liquefied halogen reactant through the horizontally positioned cells of the stack, such as the stack 103 of FIG. 1, in the discharge mode. The electrolyte flow paths in FIG. 2 are represented by arrows. For each of the cells in the stack, the flow may proceed from a feed pipe or manifold 21 (element 115 in FIG. 1), into a distribution zone 22, through a porous "chlorine" electrode 23, over a metal electrode 25, which may comprise a substrate, which may be, for example, a titanium substrate or a ruthenized titanium substrate, and an oxidizable metal, which may be, for example, zinc, on the substrate, to a collection zone 26, through an upward return manifold 27 (element 121 in FIG. 1), and to a return pipe 29 (element 122 in FIG. 1).

In some embodiments, an element 24 may be placed on a bottom of metal electrode 25. Yet in some other embodiments, such an element may be omitted. The purpose of the element 24 may be to prevent the flow of the metal-halide electrolyte from contacting the active metal electrode, when passing through a porous electrode of an adjacent cell located beneath. In other words, element 24 prevents the electrolyte from touching one side (e.g., the bottom side) of every metal electrode 25 so that the metal (e.g., zinc) plates only on the opposite side (e.g., the top side) of the metal electrode 25. In some cases, the element 24 may comprise the polymer or plastic material.

FIG. 2 also shows barriers 30. Each barrier 30 may be a part of a cell frame discussed in a greater detail below. Barrier 30 may separate the positive electrode from the negative electrode of the same cell. Barriers 30 may comprise an electrically insulating material, which can be a polymeric material, such as poly vinyl chloride (PVC).

In the configuration depicted in FIG. 2, the metal-halide electrolyte may be forced to flow down through the porous electrode and then up to leave the cell. Such a down-and-up flow path may enable an electrical contact of the porous electrode and the metal electrode in each cell with a pool of the metal halide electrolyte remaining in each cell when the electrolyte flow stops and the feed manifold, distribution zone, collection zone, and return manifold drain. Such a contact may allow maintaining an electrical continuity in the stack of cells when the flow stops and may provide for an uninterrupted power supply (UPS) application without continuous pump operation. The down-and-up flow path within each cell may also interrupt shunt currents that otherwise would occur when electrolyte flow stops. The shunt currents are not desired because they may lead to undesirable self-discharge of the energy stored in the system and an adverse non-uniform distribution of one or more active materials, such as an oxidizable metal, such as Zn, throughout the stack.

Figure 5A:
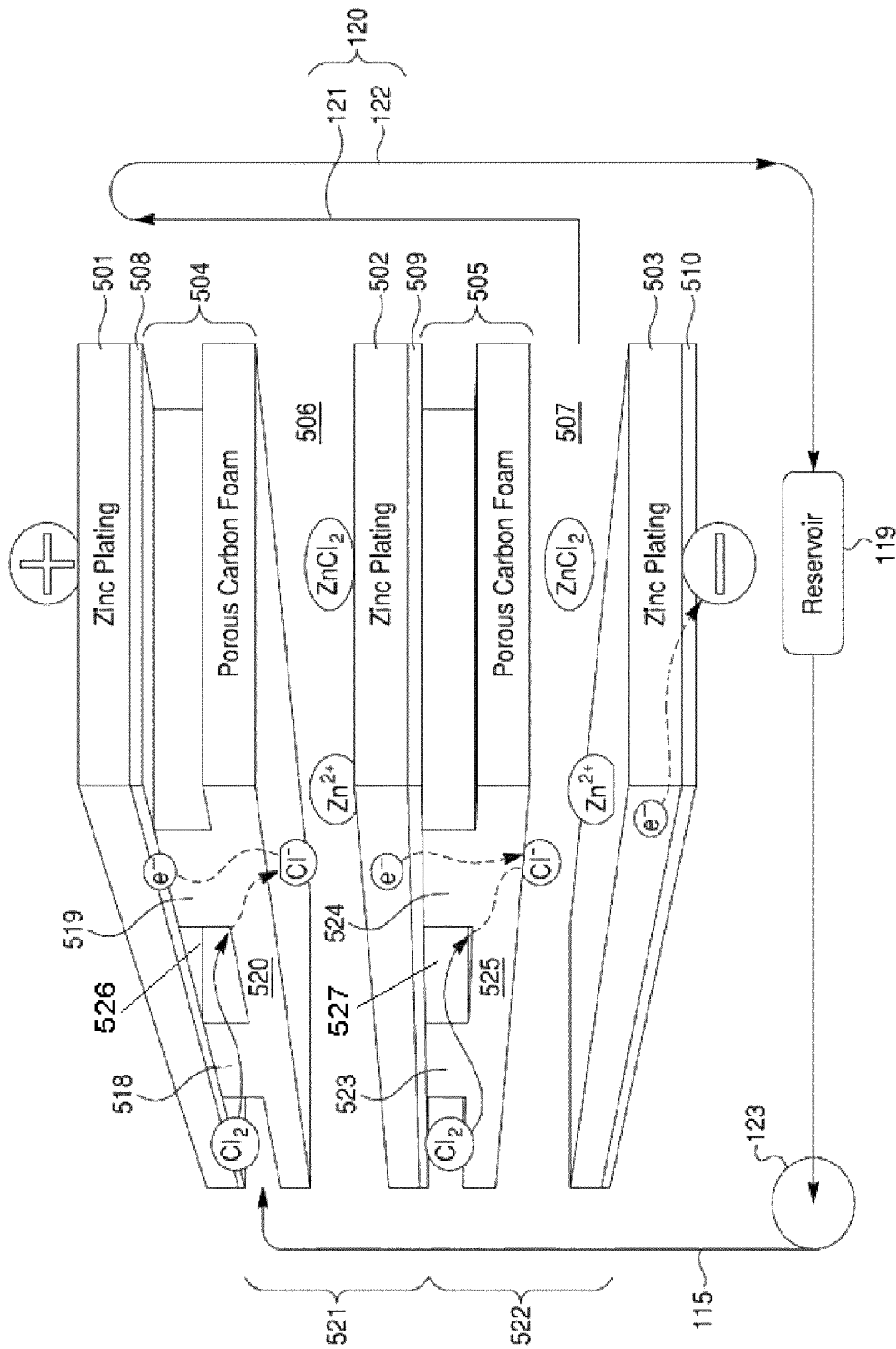
FIG. 5a schematically illustrates a three dimensional view of flow paths in the electrochemical system with downward flow in a discharge mode.

FIG. 5a further illustrates flow paths through the stacked cells using $ZnCl_2$ as an exemplary metal-halide electrolyte and $Cl_2$ as an exemplary halogen reactant. The stack in FIG. 5a includes a first cell 521, which has a reaction zone 506 between a positive electrode 504, e.g., a porous or permeable metal "chlorine" electrode, and a negative electrode 502, e.g., a zinc electrode, and a second cell 522, which has a reaction zone 507 between a positive electrode 505 and a negative electrode 503. The negative electrode 502 of the cell 522 is electrically connected to the positive electrode 505 of the cell 521, thereby providing electrical continuity between the cells of the stack. Each of the negative electrodes may comprise a conductive impermeable element, such as a titanium plate. Such element is shown as element 509 for the electrode 502 and element 510 for the electrode 503.

FIG. 5a also shows an electrode 501 or a terminal plate positioned over the positive electrode 504 of the cell 521. When the cell 521 is the top terminal cell, the electrode 501 can be the terminal positive electrode of the stack. If the cell 521 is not the terminal cell, then the electrode 521 can be a negative electrode of an adjacent cell of the stack. The positive electrodes 504 and 505 are preferably porous electrodes, such as a permeable metal electrodes.

The cells may be arranged in the stack in such a manner that a cell-to-cell distance may be significantly greater that a distance between positive and negative electrodes of a particular cell of the stack (an interelectrode distance). The interelectrode distance may be, for example, 0.5-5 mm such as 1-2 mm. In some embodiments, the cell-to-cell distance may be at least 3 times or at least 5 times or at least 8 times or at least 10 times, such as 3-15 times greater, than the interelectrode distance. The cell-to-cell distance may be defined as between two analogous surfaces in two adjacent cells. For example, the cell-to-cell distance may be a distance between an upper surface of the negative electrode 502 of the cell 521 and an upper surface of the negative electrode 503 of the cell 522. The cell-to-cell distance may be 5-20 mm, such as 10-15 mm. The distance between a particular cell's positive and negative electrodes in FIG. 5a is a distance between the lower surface of the positive electrode 504 of the cell 521 and the upper surface of the negative electrode 502 of the same cell.

To achieve the significant difference between the cell to cell distance and the interelectrode distance in a particular cell, at least one of positive or negative electrodes may comprise one or more electrically conductive spacers, which (i) increase the cell-to-cell distance compared to the interelectrode distance, (ii) provide a electrical contact between positive and negative electrodes of adjacent cells, and (iii) create flow channels in a flow path of the electrolyte.

In FIG. 5a, the positive electrode 505 of the cell 522 has a porous part 525 and two conductive spacers 523 and 524, which are electrically connected to the negative electrode 502 of the adjacent cell 521. The conductive spacers 523 and 524 may or may not be made of a porous material. In certain embodiments, conductive spacers, such as spacers 523 and 524, may be made of non-permeable metal as will be described below. Similarly to the electrode 505, the electrode 504 of the cell 521 contains a porous part 520 and two conductive spacers 518 and 519. An electrolyte flow path 526, 527 exists between adjacent anode and cathode electrodes of adjacent cells. The conductive spacers 518, 519 divide the flow path 526, 527 into flow channels as will be described below. The anode and cathode electrodes of the same cell are separated from each other by one or more insulating spacer(s) (shown in FIG. 9B as element 529) and/or by the cell frame (element 301 shown in FIG. 3) to create a reaction zone 506, 507 flow path in each respective cell 521, 522.

In addition to the cells 521 and 522, FIG. 5a shows a reservoir 119; a feed line 115, which includes a pump 123; and a return manifold 120, which includes an upper running part 121 and a part 122, which is connected with the reservoir 119. Together the reservoir 119, the feed line 115, the return manifold 120, flow paths 526, 527 and the reaction zone 506, 507 flow paths form a closed loop (e.g. flow circle) for the metal halide electrolyte, which is illustrated as $ZnCl_2$ in FIG. 5a, and the halogen reactant ($Cl_2$ in FIG. 5a).

In the discharge mode, a mixture of the metal halide electrolyte and the liquefied halogen reactant arrives from the reservoir 119 in channel shaped flow paths 526, 527 between the spacers 518/519, 523, 524 at the top of a respective positive electrode of a cell, such as electrode 504 for cell 521 and the electrode 505 for the cell 522. The halogen reactant is reduced at the positive electrode. After the mixture penetrates through a porous part of the positive electrode (part 520 for the cell 521 and part 525 for the cell 522), it becomes enriched with halogen anions (Cl– in the case of molecular chlorine used as the halogen reactant).

The reaction zone of the cell, such as zone 506 for the cell 521 or zone 507 for the cell 522, is also a flow channel which does not contain a membrane or a separator configured to separate halogen anions, such as Cl–, from the metal halide electrolyte. Thus, from the positive electrode, the halogen anion enriched mixture proceeds down to the negative electrode, such as electrode 502 for the cell 521 and electrode 503 for the cell 522. In the discharge mode, a metal of the negative electrode is oxidized forming positive ions that are released into the halogen anion enriched mixture.

For example, if the negative electrode comprises metallic Zn as shown in FIG. 5a, the metallic zinc is oxidized into zinc ions, while releasing two electrons. The electrolyte mixture, which is enriched with both halogen anions and metal cations after contacting the negative electrode, leaves the cell through a path in the cell frame (as will be described with respect to FIG. 3) and the upper running return manifold and goes back to the reservoir, where the mixture can be resupplied with a new dose of the liquefied halogen reactant. In sum, in the system illustrated in FIG. 5a, the following chemical reactions can take place in the discharge mode:

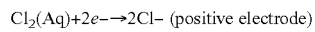

$Cl_2(Aq)+2e-\rightarrow 2Cl-$ (positive electrode)

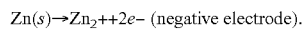

$Zn(s)\rightarrow Zn_2{++}2e-$ (negative electrode).

As the result of these reactions, 2.02 V per cell can be produced.

In the discharge mode, the electrochemical system can consume the halogen reactant and the metal constituting the negative electrode and produce an electrochemical potential. In the charge mode, the halogen reactant and the metal of the electrode may be replenished by applying a potential to the terminal electrodes of the stack. In the charge mode, the electrolyte from the reservoir moves in the direction opposite to the one of the discharge mode.

For FIG. 5a, such opposite movement means that the electrolyte moves counterclockwise. In the charge mode, the electrolyte enters the cell, such as cell 521 or 522, after passing through the return manifold 520, at the electrode, which acts as a negative electrode in the discharge mode but as a positive electrode in the charge mode. Such electrodes in FIG. 5a are the electrode 502 for the cell 521 and electrode 503 for the cell 522. At this electrode, the metal ions of the electrolyte may be reduced into elemental metal, which may be deposited back at the electrode Zinc plates on top of each electrode 502, 503. For example, for the system in FIG. 5a, zinc ions may be reduced and deposited at the electrode 502 or 503 ($Zn_2$++2 e-→Zn). The electrolyte then may pass upwards through a porous electrode, such as electrodes 505 and 504 in FIG. 5a, where halogen ions of the electrolyte may oxidize forming molecular halogen reactant.

For the case illustrated in FIG. 5a, chlorine ions of the metal-halide electrolyte oxidize at the electrodes 505 and 504 forming molecular chlorine. Because the system illustrated in FIG. 5a is placed under a pressure above the liquefication pressure for the halogen reactant, the halogen reactant, which is formed at the electrodes 505 and 504, is in liquid form after the aqueous solution is saturated with dissolved chlorine.

The electrolyte leaves the cell, such as cell 521 or 522, in a form of a mixture with the formed halogen reactant through flow paths 526, 527 and then through the pipe or manifold 115. A concentration of the metal halide electrolyte in the mixture can be lower than a concentration of the electrolyte that entered the cell from the pipe 120. From the pipe 115, the mixture may enter the reservoir, where it can be separated into the halogen reactant and the metal electrolyte per se using, for example, gravity and an optional sump plate, or some type of separating membrane.

Figure 5B:
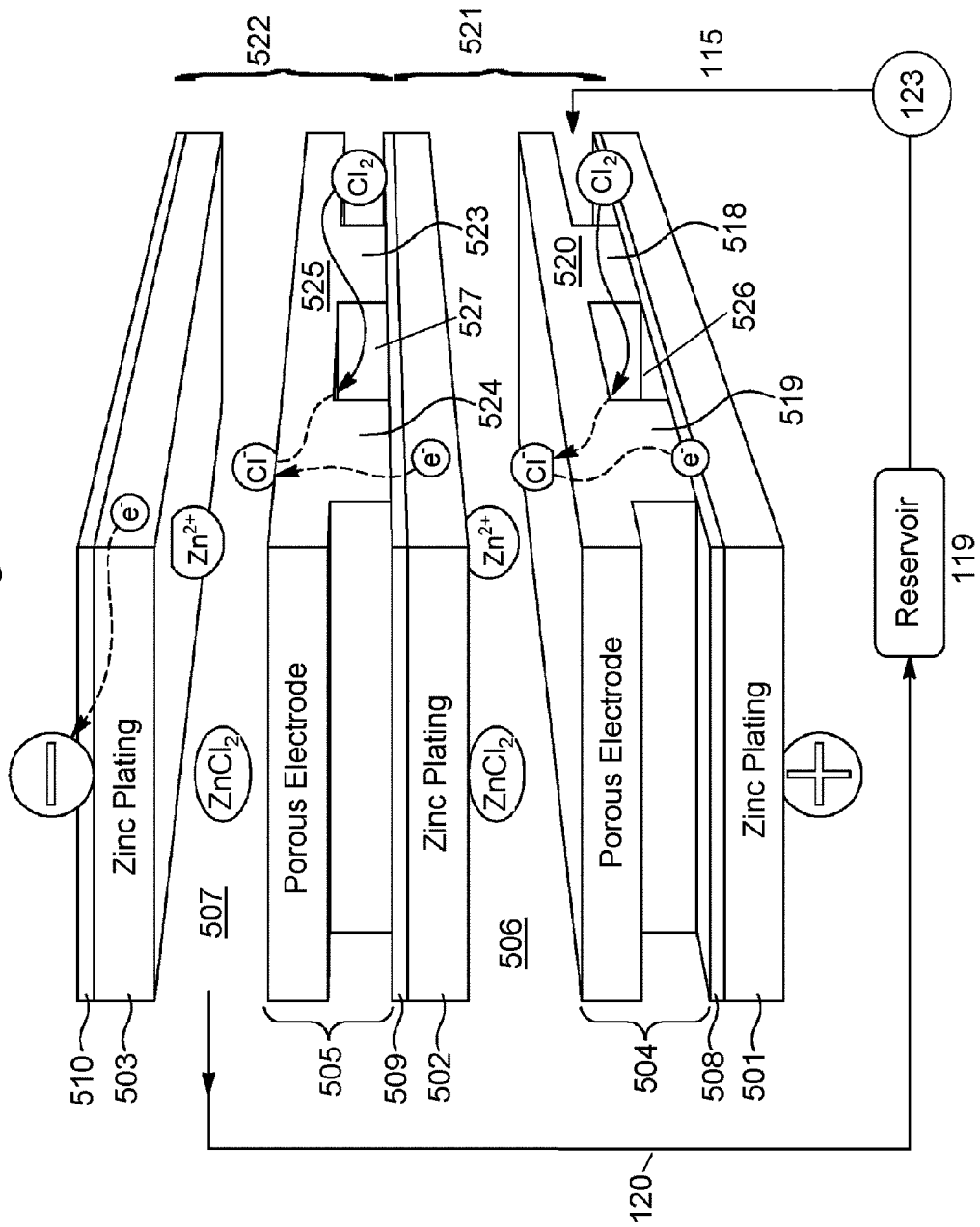
FIG. 5b schematically illustrates a three dimensional view of flow paths in the electrochemical system with upward flow in a discharge mode.

FIG. 5b illustrates an alternative flow configuration through the vertical stack 103 of electrochemical cells. In this embodiment, the electrochemical cells are inverted (i.e., placed upside down) relative to the embodiment illustrated in FIG. 5a. That is, the electrochemical cells are configured so that in discharge mode, the electrolyte flows from the bottom of each cell 521, 522, through flow paths 526, 527 then through the porous parts 520, 525 of electrodes 504, 505 into the reaction zones 506, 507 and then back into reservoir 119. In charge mode, the electrolyte flows in the opposite direction (i.e., from reaction zones 506, 507 down through electrodes 504, 505 into the flow paths 526, 527). In this embodiment, zinc plates on the bottom of the negative metal electrodes 501, 502, 503 in charge mode. In this manner, the electrodeposited zinc layer grows in a downward direction in charge mode.

In discharge mode, zinc oxidizes and thereby dissolves from the negative metal electrodes 502, 503. Zinc ions, $Zn^{2+}$ enter the electrolyte as the zinc dissolves. Molecular chlorine is reduced at the porous electrode to form chlorine ions.

As in the previous embodiment, a reservoir 119 is provided at the bottom the vessel 101. Also included is a discharge pump 123 operatively attached to the reservoir 119. Electrolyte is pumped from the reservoir 119 via a feed pipe or manifold 115 to flow paths 526, 527 between conductive spacers 518/519, 523/524 through the porous regions 502, 525 in electrodes 504, 505. The electrolyte exits the reactions zones 506, 507 and returns to the reservoir 119 via a return pipe or manifold 120.

Figure 3:
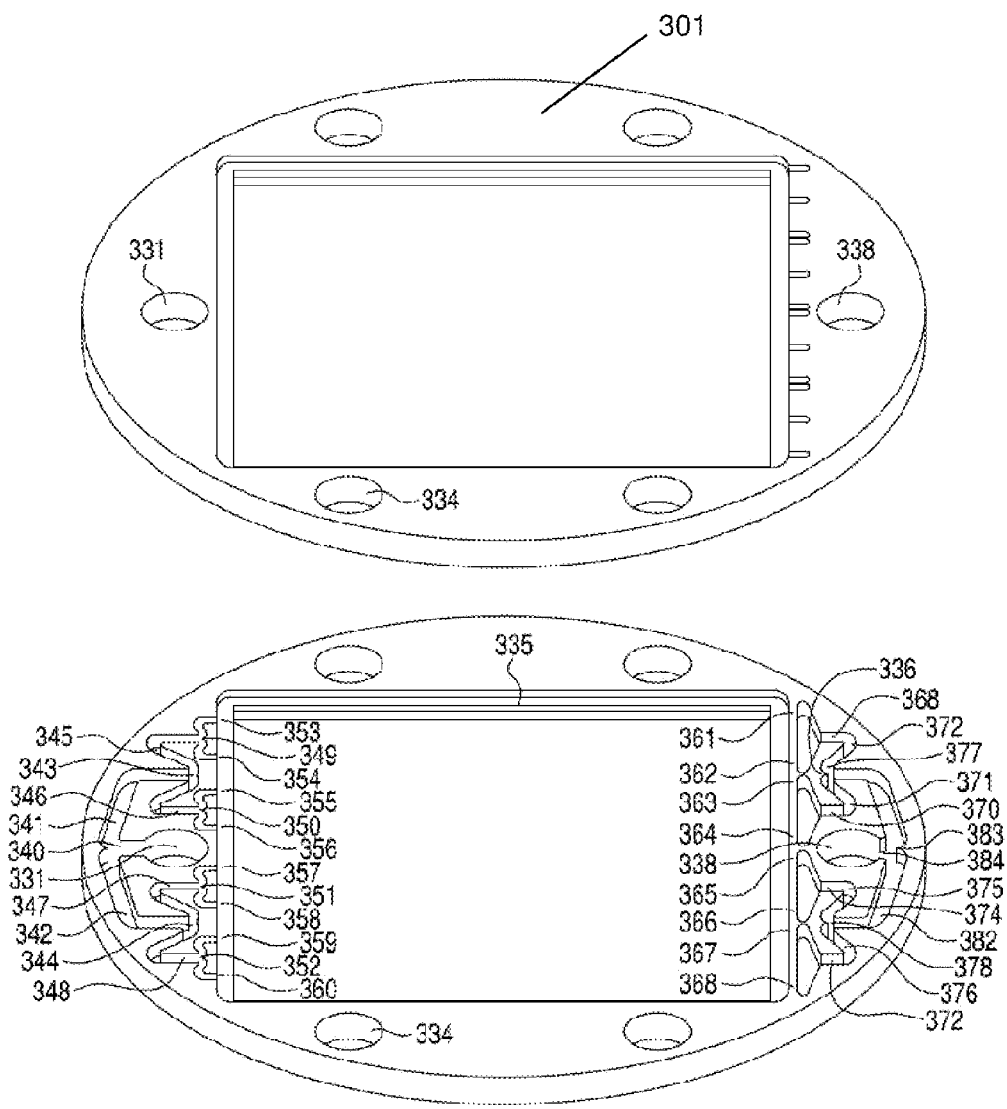
FIG. 3 illustrates a three dimensional view of cell frames that can be used in certain embodiments of the electrochemical system.

Before being delivered to the cells, the metal halide electrolyte mixed with the liquefied halogen reactant may undergo one or more flow splits, which may result in multiple flow paths to the porous electrode. These flow paths may have the same flow resistance. Each of the one or more splits may divide the flow into two. For example, FIG. 3 illustrates one possible cell design that has a first level splitting node 340, which splits the flow of the metal halide electrolyte and the liquefied halogen reactant, which is provided through the feed manifold 331, into subflows 341 and 342. Each of the subflows 341 and 342 may further split into two next level subflows at second level splitting nodes 343 and 344 respectively. Each of the four subflows 345, 346, 347, and 348, that are formed at the second level nodes, further split into two third level subflows at third level nodes 349, 350, 351 and 352 respectively.

As the result of the three levels of splitting, the flow of the metal halide electrolyte and the liquefied halogen reactant may enter the cell through eight separate paths 353, 354, 355, 356, 357, 358, 359, 360, each of which has the same flow resistance because they have the same length and the same number of turns, which have the same radius, i.e. the same geometry. The flow splitting nodes may split the flow of the electrolyte and the halogen reactant for each cell of the stack. The electrolyte and the liquefied halogen reactant may leave the cell through a multiple flow paths or through a single flow path.

In some embodiments, the multiple flow paths may merge into a lesser number of flows before reaching the return manifold or pipe. For example, FIG. 3 shows that the electrolyte and the liquefied halogen reactant may leave the bottom of the cell through eight flow paths 361-368. Since the flow leaves through the bottom of the cell, paths 361-368 do not have a direct connection to the top of the cell in the view shown in FIG. 3. Adjacent flow paths 361 and 362, 363 and 364, 365 and 366, 367 and 368 merge at first-level merging nodes 369-372 into second-level flow paths 373, 374, 375 and 376 respectively. The second level flow paths further merge at four second level merging nodes 377 and 378 forming two third-level flow paths 381 and 382, which further merge at a third-level node 383, forming a single flow 384, which enters the return manifold 338. Each of the flow paths 361-368 have the same flow resistance as they have the same length and the same number of turns, which have the same radius, on its way to the return manifold.

FIG. 3 illustrates an electrochemical cell that comprises a cell frame 301. Such an electrochemical cell may be used to achieve the structures and flows shown in FIG. 2. The cell frame 301 may include a feed manifold element 331, distribution channels, flow splitting nodes, spacer ledge 335, flow merging nodes, collection channels, return manifold element 338, and bypass conduit elements 334.

In some embodiments, plural cell frames 301, that are each identical or similar to the frame 301 depicted in FIG. 3, may be stacked vertically with the electrodes in place, to form the stack shown in FIG. 2. To form such a stack, the feed manifold element, such as the element 331 in FIG. 3, in each of the plural cells frames 301 may be aligned with the feed manifold element in another of the cell frames 301, thereby to form a feed manifold of the system. The distribution channels and the flow splitting nodes in each of the cell frames 301 may be aligned with the distribution channels and the flow splitting nodes in another of the cell frames 301, thereby forming a distribution zone of the system. The positive electrode (discharge mode) of each of the cells sits above or below the negative electrode (discharge mode) for each cell on the spaces ledges of the cell frames 301, thereby forming alternating layers of positive electrodes and negative electrodes.

The flow merging nodes and the collection channels in each of the plural cells frames 301 may be aligned with the flow merging nodes and the collection channels in another of the cell frames 301, thereby forming a collection zone of the system. The return manifold element, such as the element 338 in FIG. 3, in each of the cell frames 301 may be aligned with the return manifold element in another of the cell frames 301, thereby forming a return manifold of the system. The bypass conduit element, such as the element 334 in FIG. 3, in each of the cell frames 301 may be aligned with the bypass conduit element in another of the cell frames 301, thereby forming a bypass conduit of the system. The bypass conduit may be used for fluid flow and/or electrical wires or cables.

In some embodiments, the cell frame 301 may have a circular shape. Such a shape may facilitate insertion of the plural cells into a pressure containment vessel, which has a cylindrical shape, thereby reducing a production cost for the system. The frames 301 may comprise an electrically insulating material, which may be a polymer material, such as PVC.

The cell frame 301 based design may facilitate a low-loss flow with uniform distribution for the electrolyte and the halogen reactant; a bipolar electrical design; an ease of manufacture, internal bypass paths, and elements by which the operational stasis mode (described below) may be achieved.

Advantages of the cell frame 301 may include, but are not limited to, the flow-splitting design in the distribution zone that may include multiple order splits such as the first, second, and third order splits in the flow channels in FIG. 3, that result in multiple channels that each have the same flow resistance, because each of the channels has the same length and the number and radius of bends. FIG. 3 shows eight feed channels per cell that each have the same flow resistance. This design with multiple flow splits may allow maintenance of a laminar flow through each of the multiple channels. The design may allow equal division of flow volume between the multiple channels, independent of flow velocity, uniformity of viscosity, or uniformity of density in the electrolyte.

MODES OF OPERATION

An Off Mode may be used for storage or transportation of the electrochemical system. During the Off Mode, the metal halide electrolyte and the halogen reactant are not delivered to the cell. A small amount of the halogen reactant, which may remain in the horizontally positioned, may be reduced and combined with metal ions to form metal halide. For example, the remaining liquefied chlorine reactant may be reduced into halogen anions and combined with zinc ions to form zinc chloride.

In the off mode, the terminal electrodes of the one or more cells of the system may be connected via a shorting resistor, yielding a potential of zero volts for the cells of the system. In some embodiments, a blocking diode preferably may be used to prevent reverse current flow through the system via any external voltage sources.

During the Discharge Mode the discharge pump may be on and the mixture of the metal halide electrolyte and the halogen reactant may be circulated through the cell(s) of the system. Electrons may be released as metal cations are formed from the oxidizable metal that constitutes the negative electrode. The released electrons may be captured by the halogen reactant, thereby reducing the reactant to halogen anions and creating an electrical potential on terminal electrodes of the cell(s) of the system. The demand for power from the system may consume the halogen reactant, causing a release of an additional dose of the liquefied halogen reactant from the reservoir into the feed pipe or manifold of the system.

During the Stasis or Standby Mode, there may be little or no flow of the metal halide electrolyte and the halogen reactant. The availability of the system may be maintained via a balancing voltage. This balancing voltage may prevent a self-discharge of the system by maintaining a precise electrical potential on the cell(s) of the system to counteract the electrochemical reaction forces that can arise when there is no circulation of the metal halide electrolyte and the halogen reactant. The particular design of the cell plates disclosed may interrupt shunt currents that would otherwise flow through the feed and return manifolds, while maintaining cell-to-cell electrical continuity.

FIGS. 9a and 9b illustrate an all metal electrode assembly 900 according to an embodiment. The all metal electrode assembly 900 includes an impermeable (e.g., non-porous) metal cathode 25, a permeable metal anode 23 and preferably impermeable metal spacers 518, 519. An impermeable cathode does not allow electrolyte to flow through it while a permeable anode allows the electrolyte to flow through it and may be porous.

The impermeable metal cathode 25 may be made of a platable transition metal. The impermeable metal cathode 25, for example, may be made of zinc, titanium, aluminum plated titanium or tantalum. The permeable metal anode 23 may be made of a transition metal with a deposited or alloyed surface coating of a noble metal anode electrode. The permeable metal anode 23 may be made of ruthenium or iridium coated titanium or tantalum (e.g., ruthenium oxide coated titanium). Further, the permeable metal anode 23 may be made of at least one of metal felt, metal foam, metal screen, metal mesh, metal plate with holes, metal woven fabric, metal wool, permeable sintered metal powder, packed metal powder, or packed metal powder in a porous container. The permeable metal electrode 23 may also be any other porous structure allowing electrolyte to pass through.

The impermeable metal cathode 25, may be fabricated from sheet metal, cast, forged, compacted from powder metal or fabricated by any other technique suitable for forming impermeable metal electrodes. As illustrated in FIGS. 9a, 9b, the impermeable metal cathode is flat. In alternative embodiments, however, the impermeable electrode 25 may have corrugations, protrusions, channels, or other features rendering the impermeable electrode 25 non-flat. The permeable metal electrode 23 may include multiple layers, such as a multilayer metal mesh or multilayer foam. In the all metal electrode assembly 900, the metal spacers 518, 519 may operate as flow directors which separate the electrolyte flow path 526 into a number distinct of electrolyte flow channels 526a, 526b, etc.

In the all metal electrode assembly 900 of this embodiment, the impermeable metal cathode 25 of one cell (e.g. cell 521 of FIG. 5a), the permeable metal anode 23 of an adjacent cell (e.g., cell 522 of FIG. 5a) and metal spacers 518, 519 are attached to each other. Attachment may be accomplished by welding, sintering, or otherwise mechanically attaching so that a single unit is formed. Attachment is preferably done at joints 901 where the impermeable metal cathode 25, the permeable metal anode 23 and metal spacers 518, 519 are in contact. In one aspect of this embodiment, the metal spacers 518, 519 are connected with a connecting element 528. The connecting element 528 also acts as a barrier which forces the electrolyte to flow through the permeable anode 23 and prevents direct flow between conduits 115 and 120 through the flow path 526. In addition to providing separation between the impermeable metal cathode 25 and the permeable metal anode 23, the metal spacers 518, 519 define flow channels between the impermeable metal cathode 25 and the permeable metal anode 23 which help direct the flow of electrolyte across the surface of the permeable metal anode 23. The metal spacers 518, 519 may be parallel and hence, form parallel flow channels.

Because the impermeable metal cathode 25, the permeable metal anode 23 and metal spacers 518, 519 are all made of metal or substantially of metal, the impermeable metal cathode 25 and the permeable metal anode 23 are electrically connected. The impermeable metal cathode 25 and the permeable metal anode 23 of the all metal electrode assembly 900, however, are not part of the same electrochemical cell. The assembly 900 corresponds to, for example, the negative electrode 501, conductive spacers 518, 519 and permeable electrode 504 illustrated FIG. 5*a*. As illustrated in FIG. 5*a*, however, electrochemical cell 521 includes the permeable or porous electrode 504 and the non-permeable negative electrode 502, which are separated by reaction zone 506. Maintaining the reaction zone 506 flow path gap between the impermeable electrode 502 and the permeable electrode 504 of electrochemical cell 521 is an insulating (i.e., non-conducting) cell frame 301 and optional insulating spacers 529 which extend between portions of the cell frame. Insulating spacers 529 may be made from the same material as the frame 301 and may comprise unitary portions of the frame.

The inventors have found that by fabricating an all metal electrode assembly 900, rather than stacking individual components, results in improved efficiency in the production of electrochemical stacks 103. Further, as discussed in more detail below, embodiments of the present invention can be assembled in a way that accommodates tolerance stack-up requirements for assemblies not seen in conventional flow cells. Further advantages include one or more of: reduced cell impedance, better performance, a longer service life, fewer failure mechanisms, better control over cell geometry and stacking tolerance, better refurbishment and/or recycling characteristics, and the ability to assemble component materials using common techniques such as sheet metal forming, welding, brazing, sintering.

Figure 10A:
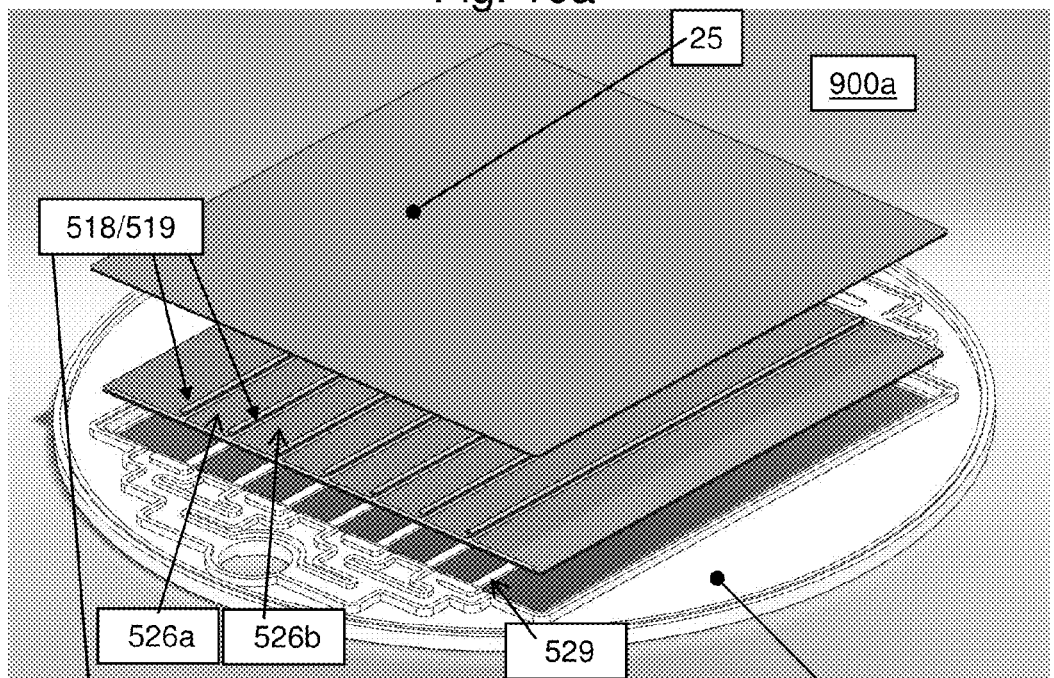
FIG. 10a illustrates an exploded view of another embodiment of an electrode assembly.
Figure 10B:
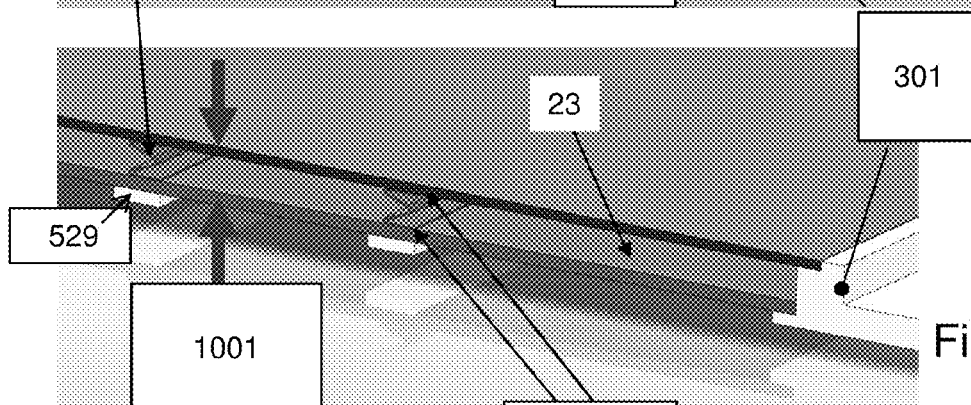
Figure 10C:
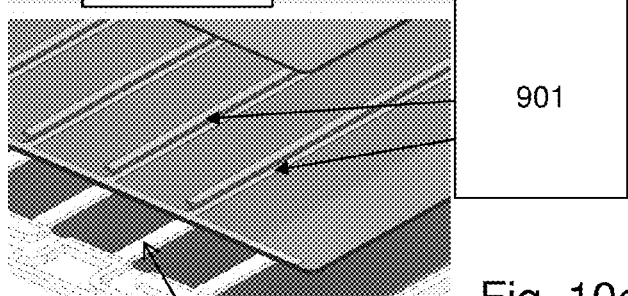

FIGS. 10*a* to 10*c* illustrate another embodiment of an electrode assembly 900A. This embodiment is similar to the embodiment illustrated in FIGS. 9*a*, 9*b*, however, the conductive spacers 518, 519 in this embodiment are flexible. That is, the conductive spacers 518, 519 are configured to compress (e.g., change their height by at least 10%, such as at least 20%), absorbing compressive stress on the electrochemical cell. In this manner, the gap 1001 between the impermeable metal cathode 25 of one cell and the permeable metal anode 23 of an adjacent cell in each all metal electrode assembly 900 in a stack 103 of electrochemical cells can adjust. In this way, a greater stacking tolerance can be achieved, especially in a large stack 103 of electrochemical cells. The conductive spacers 518, 519 may be fan-shaped (i.e., corrugated or zig-zag shaped) and fabricated out of sheet metal. The design and materials of the conductive spacers 518, 519 may be selected so that the conductive spacers 518, 519 may be elastically recovered, like a spring, when the compressive stress is removed. Alternatively, the conductive spacers 518, 519 may be designed to plastically deform when compressed. As in the previous embodiment, the all metal electrode assembly 900A may be assembled by welding, brazing, sintering, or any other suitable joining technique.

FIGS. 11*a*-11*c* illustrate another embodiment of an electrode assembly 900B. In this embodiment, the impermeable metal cathode 25 includes integral conductive spacers 518, 519. The impermeable metal cathode 25 of this embodiment may be fabricated, for example by stamping sheet metal. Alternatively, the impermeable metal cathode 25 of this embodiment may be fabricated by casting. Other fabrication techniques may be used as well. Because the conductive spacers 518, 519 are integral with the impermeable metal cathode 25, fabrication of the all metal electrode assembly 901 can be accomplished with fewer joining operations. Fabrication only requires joining the integral impermeable metal cathode 25/conductive spacers 518, 519 to the permeable metal anode 23. For example, the plurality of electrically conductive spacers 518, 519 comprise stamped protrusions in a battlement shaped impermeable cathode 25, such that the stamped protrusions are connected to the permeable anode 23, as shown in FIG. 11*c*. As shown in FIGS. 11*a* and 11*b*, the impermeable electrode 25 extends over and covers the edge(s) (i.e., minor surfaces) of the permeable electrode 23. The electrolyte inlets 353-360 from the cell frame are located in the edge portion of the electrode 25. The inlets 353-360 fluidly connect to a respective flow channel 526*a*, 526*b*, etc. as shown in FIG. 11*c*.

In an alternative embodiment, the conductive spacers 518, 519 may be made integrally with the permeable metal anode 23. For example, the electrically conductive spacers may comprise integrally formed protrusions in the anode, such that the protrusions are connected to the cathode. The protrusions may be made by stamping or casting the cathode into the desired shape or by sintering a metal powder in a mold having grooves corresponding to the line shaped spacers.

In the embodiments of FIGS. 9-11, the electrodes 23, 25 are rectangular shaped and the plurality of electrically conductive spacers 518, 519 extend in a substantially parallel direction to form a plurality of substantially parallel electrolyte flow channels 526*a*, 526*b*, etc. The electrodes may be located in a rectangular opening in a disc shaped or polygonal shaped frame 301.

FIGS. 12*a*-12*c* illustrate another embodiment of an electrode assembly 900C. In this embodiment impermeable metal cathode 25 in the permeable metal anode 23 are disk shaped and may have exactly or roughly circular configurations when viewed from a major surface thereof (e.g., cathode 25 in FIG. 12*a* has an exactly circular or disc configuration, while anode 23 has a "scalloped" roughly circular configuration). The electrodes may be located in a circular or roughly circular opening in a disc shaped or polygonal shaped frame 301. The conductive spacers 518, 519 are arranged in a radial pattern running from the center of the electrodes to the periphery to form a plurality of substantially radial electrolyte flow channels 526*a*, 526*b*, etc. In the center of both the impermeable metal cathode 25 and the permeable metal anode 23 is a central manifold, opening or hole 1201 that extends through the stack of cells. As shown in FIG. 12*c*, an optional ring shaped insulating spacer 529*a* may be located in the central manifold 1201. Around the periphery of both the impermeable metal cathode 25 and the permeable metal anode 23 is a series of peripheral openings or holes 1202. The openings 1202 may extend through the stack as a manifold which optionally extends through the cell frames and the cathodes and adjacent to the edges of the scalloped anodes. In one aspect of this embodiment, the central manifold 1201 may be used as a feed manifold 331 and the peripheral openings 1202 may be used as return manifolds 338. In an alternative aspect, the central manifold 1201 may be used as a return manifold 338 while one or more of the peripheral openings 1202 may be used as feed manifolds 331.

The present embodiment may be combined with one or more features of the previous embodiments. For example, the conductive spacers 518, 519 may be configured so as to be compressible. The conductive spacers 518, 519 may be configured to be elastically compressible or plastically crushable. Alternatively, the conductive spacers 518, 518 may be made integrally with either the impermeable metal cathode 25 or the permeable metal anode 23. As with the previous embodiments, the all metal electrode assembly 900 of this embodiment, may be configured to be assembled with a non-conducting frame 301 to facilitate stacking of electrochemical cells.

In the previous embodiments the electrode assemblies 900 were described as all metal electrode assemblies 900 made of a metal or a metal alloy. However, in alternative embodiments, one or all of the impermeable metal cathode 25, the permeable metal anode 23, and the conductive spacers 518, 518 need not be entirely metal. That is, in alternative embodiments one or more of the impermeable metal cathode 25, the permeable metal anode 23, and the conductive spacers 518, 518 may only be substantially metal, such as greater than 50%, preferably greater than 75% metal or metal alloy by volume. One or more of the impermeable metal cathode 25, the permeable metal anode 23, and the conductive spacers 518, 518 may include non-metal material. For example, conductive, oxidized metal, such as oxidized ruthenium is considered "substantially metal." In another example, one or more of the impermeable metal cathode 25, the permeable metal anode 23, and the conductive spacers 518, 518 may be made of a metal matrix composite with non-metallic inclusions or metal inclusions in a metal matrix. Alternatively, one or more of the impermeable metal cathode 25, the permeable metal anode 23, and the conductive spacers 518, 518 may be made of a cermet (i.e., mixed metal and ceramic phase material).

Separation Device

Figure 7:
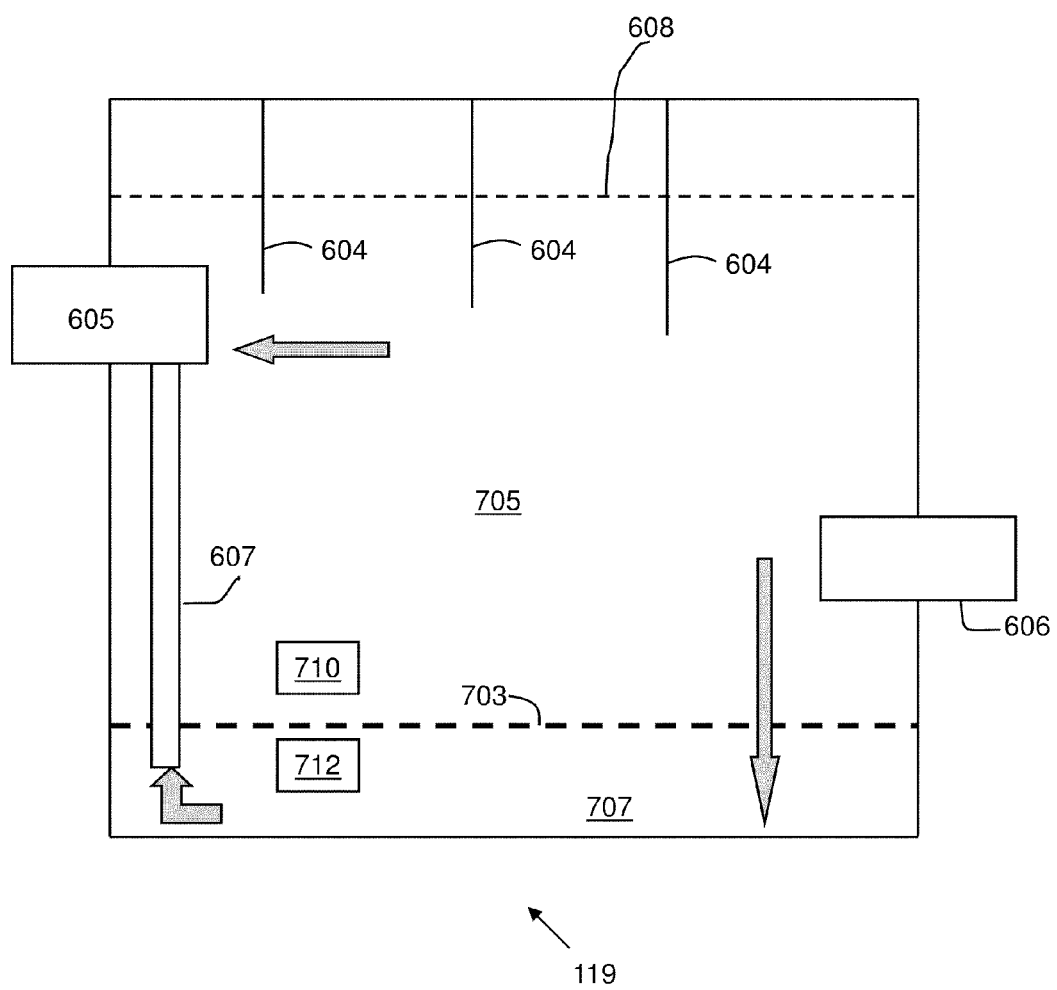
FIG. 7 schematically illustrates a side cross-sectional view of a reservoir which has a separation device in a discharge operation of the electrochemical system.

FIG. 7 illustrates another embodiment of the reservoir 119 which has a separation device 703. The reservoir 119 of the embodiment of FIG. 7 may be used with the system and method of any of the embodiments described above. The baffle plates 604 of the embodiment of FIG. 6 are optional and are not shown in the bottom portion of the reservoir 119 for clarity. The separation device 703 can be, for example, a molecular sieve, a selective membrane, or other device that is capable of separating one component of the electrolyte mixture from other components of the electrolyte, thereby facilitating modes of operation (e.g., charge and discharge) of the flow battery. The separation device 703, having an appropriate geometry and properties for separating the desired components, is preferably disposed in the reservoir 119 between the inlet to the feed line 607 and the pump inlets/outlets 605 and 606 to separate the electrolyte mixture in reservoir 119 into two volumes 705, 707 during the flow battery operation. A halogen content or concentration gradient that is provided by the separation device is desirable for both the chloride ions and the liquid chlorine type of halogen reactant.

The first volume 705 is provided for selective electrolyte component accumulation and the second volume 707 is provided for selective liquefied halogen (such as aqueous chlorine) accumulation. The second volume 707 can be located below the first volume, thereby taking advantage of the liquefied halogen having a higher density than the remaining electrolyte components. Thus, the halogen permeation from volume 705 into volume 707 may be assisted by gravity. However, depending on the type and operation of separation device 703 and the particular electrolyte and halogen components, volume 707 may be located above or to the side of volume 705. An appropriate molecular sieve or membrane 703 can selectively allow desired molecules to pass there through. The selectivity can be based on, for example, a molecular size, and/or an electrical charge of a component.

The permeability of the molecular sieve or membrane can be variable as a function of parameters such as pressure, temperature, chemical concentration, etc. One example of a molecular sieve comprises a mesoporous carbon membrane that provides size-based selectivity of molecules that can diffuse therethrough. Larger molecules are more difficult to penetrate the pores. This provides a higher permeability to the liquefied halogen reactant (e.g., aqueous chlorine) than the metal-halide electrolyte component (e.g., zinc chloride). In addition, the separation device can further comprise a device configured to apply an electric field over the membrane or the molecular sieve. An externally applied electric field can facilitate molecular diffusion through the membrane and aid the electrical-charge-based selective diffusion.

Depending on the specific liquefied halogen and the metal halide electrolyte used, the molecular sieves can be selected to have pore sizes suitable for passing predetermined molecules. Some examples of molecular sieves are described, for example, in U.S. Pat. No. 3,939,118. The molecular sieves can include granular natural or synthetic silica-alumina materials which can have lattice structures of the zeolite type (see, e.g., the monograph Molekularsiebe (Molecular Sieves) by O. Grubner, P. Jiro and M. Ralek, VEB-Verlag der Wissenschaften, Berlin 1968), with pore widths of 2 Å to 10 Å (e.g., zeolite powder or bead sieves, such as Grace Davison SYLO-SIV® brand powders), silica gel with pore widths of 40 Å to 100 Å, which are optionally absorbed in glass beads, and modified borosilicate glasses according to W. Haller (J. Chem. Phys. 42, 686 (1965)) with pore widths between 75 Å and 2,400 Å. Molecular sieves based on organic products may also be used. These products include 3-dimensionally crosslinked polysaccharides such as dextran gels (Sephadex grades, a product marketed by GE Healthcare Life Sciences), which can optionally be alkylated (Sephadex-LH grades, a product marketed by GE Healthcare Life Sciences), agarose gels (Sepharose, a product marketed by GE Healthcare Life Sciences), cellulose gels and agar gels. Other examples of synthetic organic gels include crosslinked polyacrylamides and polyethylene oxides crosslinked via acrylate groups (trade name Merckogel OR). Ion exchange gels such as three-dimensionally crosslinked polystyrenes provided with sulphonic acid groups and the dextran gels already mentioned above, where they possess the acid groups or ammonium groups required for ionexchange (dextran gel ion exchangers), may also be used.

The separation device can include a porous container or a tray that holds the membrane or the molecular sieve materials. The molecular sieve materials could be in granular or powder form. The container can include electrodes or conductive plates for applying an electric field to the membrane or the molecular sieve materials. A voltage can be applied to the electrodes or conductive plates from a voltage output of the flow battery, or from a different power source (e.g., grid power, small battery located inside or outside the flow battery vessel 101, etc.). The voltage applied to the separation device facilitates the selective diffusion of the liquefied halogen reactant through the separation device. The separation device can be permanently coupled (e.g., welded, glued, etc.) or removably coupled (e.g., bolted, clamped, etc.) to a wall of the reservoir 119. Alternatively, only the granular molecular sieve materials or the membrane may be removable from the porous container or tray, while the container or tray may be permanently coupled to the wall of the reservoir.

It should be noted that the first volume 705 does not have to exclusively contain only the remaining electrolyte components and that the second volume 707 does not have to exclusively contain only the liquefied halogen (such as aqueous chlorine). A substantial concentration difference of halogen reactant or remaining electrolyte components across the separation device 703 is sufficient. Thus, the first volume 705 may contain the liquefied halogen in addition to the remaining electrolyte components and the second volume 707 may contain the remaining electrolyte components in addition to the liquefied halogen, as long as there is a higher liquefied halogen concentration in volume 707 than in volume 705, and/or as long as there is a higher remaining electrolyte components concentration in volume 705 than in volume 707. The concentration difference can be, for example, an at least 10% difference in concentration of the halogen reactant between the first and second volumes, such as an at least 50% difference, such as an at least 100% difference, such as an at least 200% difference, for example a 10-500% difference. The separation device 703 can be selected (e.g., a specific pore size may be selected) and/or operated (e.g., by applying a particular voltage) to provide the desired concentration difference.

In the discharge mode of flow battery operation illustrated in FIG. 7, the feed line 607 has an inlet in the second volume 707 of the reservoir 119 below the separation device 703, and feeds fluid with a higher concentration of halogen reactant (i.e., the fluid with a higher concentration of desired elements for discharge flow function) from volume 707 into the flow loop. The inlet 605 of the discharge pump intakes the fluid from the first volume 705, which has a higher concentration of the remaining electrolyte components than volume 707. Optionally, the inlet 605 of the discharge pump may be omitted or may remain inoperative during discharge mode if sufficient electrolyte is present in the second volume 707. The electrolyte and the liquid halogen are mixed in the flow loop and after flowing through the cells and undergoing reactions therein, the fluid mixture is discharged back into the reservoir 119. Preferably, the mixture is discharged into the first volume 705 from charge pump inlet/outlet 606. However, a different, separate outlet may be used to discharge the mixture into volume 705 from the flow loop. Unused halogen reactant selectively or preferentially permeates through the separation device 703 (i.e., halogen reactant permeates through device 703 at a higher rate than the remaining electrolyte components) and selectively or preferentially accumulates in the second volume 707. Other electrolyte components have a lower permeability through the separation device 703 than the halogen and preferentially remain in the first volume 705. A concentration difference described above is thus established and maintained with the help of the separation device 703.

Figure 8:
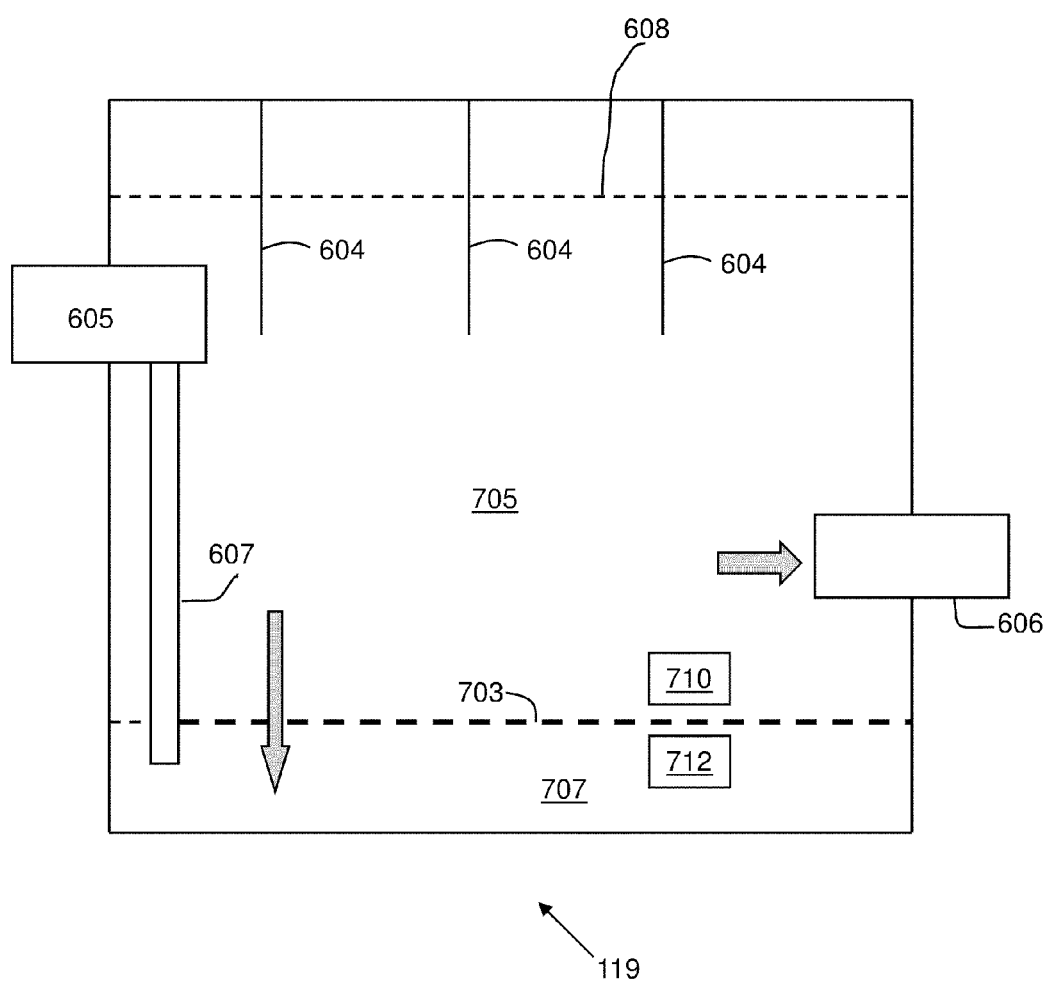
FIG. 8 schematically illustrates a side cross-sectional view of a reservoir which has a separation device in a charge operation of the electrochemical system.

In the charge mode illustrated in FIG. 8, the remaining electrolyte components in the first volume 705 are fed into the flow loop by the charge pump inlet 606 located in the first volume 705 above the separation device 703. The concentrated halogen in the second volume 707 is preferably excluded or minimized from being taken into the flow loop. After flowing through the cells and undergoing reactions therein, the fluid is discharged back into the reservoir 119. Preferably, the fluid is discharged from the discharge pump inlet/outlet 605 into the first volume 705. However, a different, separate outlet may be used to discharge the fluid into volume 705 from the flow loop. The discharged fluid is separated by the separation device 703, the halogen reactant selectively permeates into the second volume 707, leaving a higher concentration of the electrolyte component(s) in the first volume 705 than in the second volume 707.

Advantageously, the separation device enables an architecture with simplified single flow loop plumbing, valving, pump layout, etc. Alternative flow battery designs typically require two independent flow systems which are more complicated, more costly, and are more prone to cross leakage, etc.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A flow battery electrode assembly comprising:
   a first impermeable, substantially metal electrode consisting essentially of a metal;
   a second permeable, substantially metal electrode; and
   at least one electrically conductive spacer connecting the first impermeable, substantially metal electrode and the second permeable, substantially metal electrode such that the first impermeable, substantially metal electrode and the second permeable, substantially metal electrode are spaced apart from each other by an electrolyte flow path;
   wherein the at least one electrically conductive spacer comprises a plurality of electrically conductive spacers which mechanically and electrically connect the adjacent first impermeable, substantially metal electrode and second permeable, substantially metal electrode.

2. The flow battery electrode assembly of claim 1, wherein:
   the first impermeable, substantially metal electrode consists essentially of a platable metal plate or the platable metal plate that is plated with a layer of zinc; and
   the second permeable, substantially metal electrode comprises pure metal, metal alloy or cermet electrode.

3. The flow battery electrode assembly of claim 2, wherein the first impermeable, substantially metal electrode comprises a cathode electrode, and the second permeable, substantially metal electrode comprises a transition metal with a deposited or alloyed surface coating comprising noble metal anode electrode.

4. The flow battery electrode assembly of claim 3, wherein:
   the cathode electrode comprises a zinc, aluminum plated titanium, titanium, or tantalum electrode; and
   the anode electrode comprises a ruthenium or iridium coated titanium or tantalum electrode.

5. The flow battery electrode assembly of claim 1, wherein the second permeable, substantially metal electrode comprises at least one of metal felt, metal foam, metal screen, metal mesh, metal plate with holes, metal woven fabric, metal wool, permeable sintered metal powder, packed metal powder, or packed metal powder in a porous container.

6. The flow battery electrode assembly of claim 1, wherein the first impermeable, substantially metal electrode and the second permeable, substantially metal electrode are mechanically and electrically connected using the at least one electrically conductive spacer.

7. The flow battery electrode assembly of claim 6, wherein the at least one electrically conductive spacer comprises a spring configured to be compressed.

8. The flow battery electrode assembly of claim 6, wherein the at least one electrically conductive spacer is integral with at least one of the first impermeable, substantially metal electrode or the second permeable, substantially metal electrode.

9. The flow battery electrode assembly of claim 1, wherein the plurality of electrically conductive spacers comprise flow directors which separate the electrolyte flow path into a plurality of electrolyte flow channels between the adjacent first impermeable, substantially metal electrode and second permeable, substantially metal electrode.

10. The flow battery electrode assembly of claim 9, wherein the adjacent first impermeable, substantially metal electrode and second permeable, substantially metal electrode are rectangular shaped and the plurality of electrically conductive spacers extend in a substantially parallel direction to form a plurality of substantially parallel electrolyte flow channels.

11. The flow battery electrode assembly of claim 9, wherein the adjacent first impermeable, substantially metal electrode and second permeable, substantially metal electrode are connected to the plurality of spacers by welds.

12. The flow battery electrode assembly of claim 9, wherein the plurality of electrically conductive spacers comprise stamped protrusions in a battlement shaped first impermeable, substantially metal electrode, such that the stamped protrusions are connected to the second permeable, substantially metal electrode.

13. The flow battery electrode assembly of claim 9, wherein the plurality of electrically conductive spacers comprise integrally formed protrusions in the second permeable, substantially metal electrode, such that the protrusions are connected to the first impermeable, substantially metal electrode.

14. The flow battery electrode assembly of claim 1, wherein the electrode assembly is located in a central opening in an electrically insulating frame which supports the first impermeable, substantially metal electrode and the second permeable, substantially metal electrodes.

15. The flow battery electrode assembly of claim 14, wherein the frame comprises a disc shaped or polygonal plate shaped frame comprising:
at least a first and a second electrolyte flow manifolds;
a first set of flow channels on a first surface of the frame connecting the first manifold with the central opening;
a second set of flow channels on an opposite, second surface of the frame connecting the second manifold with the central opening.

16. A flow battery comprising:
a vessel;
a stack of electrochemical cells comprising a plurality of the electrode assemblies of claim 1 located in the vessel;
a reservoir located in the vessel, the reservoir configured to accumulate a metal-halide electrolyte; and
a flow circuit located in the vessel, the flow circuit configured to deliver the metal-halide electrolyte between the reservoir and the stack of electrochemical cells.

17. The flow battery of claim 16, wherein:
the first impermeable, substantially metal electrode and the second permeable, substantially metal electrode are electrically connected in series to electrically connect in series the electrochemical cells in the stack;
the stack of electrochemical cells comprises a first electrochemical cell and an adjacent second electrochemical cell;
a cathode electrode of the first electrochemical cell comprises the first impermeable, substantially metal electrode;
an anode electrode of the second electrochemical cell comprises the second permeable, substantially metal electrode;
the at least one electrically conductive spacer connects the cathode electrode of the first electrochemical cell to the anode electrode of the second electrochemical cell;
an anode electrode of the first electrochemical cell is separated from the cathode electrode of the first electrochemical cell by a reaction zone of the first electrochemical cell; and a cathode electrode of the second electrochemical cell is separated from the anode electrode of the second electrochemical cell by a reaction zone of the second electrochemical cell.

18. A flow battery electrode assembly comprising:
a first impermeable, substantially metal electrode;
a second permeable, substantially metal electrode; and
at least one electrically conductive spacer connecting the first impermeable, substantially metal electrode and the second permeable, substantially metal electrode such that the first impermeable, substantially metal electrode and the second permeable, substantially metal electrode are spaced apart from each other by an electrolyte flow path;
wherein the first impermeable, substantially metal electrode and the second permeable, substantially metal electrode are mechanically and electrically connected using the at least one electrically conductive spacer; and
wherein the at least one electrically conductive spacer comprises a plurality of electrically conductive spacers which mechanically and electrically connect the adjacent first impermeable, substantially metal electrode and second permeable, substantially metal electrode.

19. The flow battery electrode assembly of claim 18, wherein:
the first impermeable, substantially metal electrode and the second permeable, substantially metal electrode comprise greater than 50% metal by volume; and
the second permeable, substantially metal electrode comprises pure metal, metal alloy or cermet electrode.

20. The flow battery electrode assembly of claim 19, wherein:
the first impermeable, substantially metal electrode comprises a cathode electrode;
the second permeable, substantially metal electrode comprises an anode electrode,
the cathode electrode comprises a zinc, aluminum plated titanium, titanium, or tantalum electrode; and
the anode electrode comprises a ruthenium or iridium coated titanium or tantalum electrode.

21. The flow battery electrode assembly of claim 18, wherein the second permeable, substantially metal electrode comprises at least one of metal felt, metal foam, metal screen, metal mesh, metal plate with holes, metal woven fabric, metal wool, permeable sintered metal powder, packed metal powder, or packed metal powder in a porous container.

22. The flow battery electrode assembly of claim 18, wherein the plurality of electrically conductive spacers comprise flow directors which separate the electrolyte flow path into a plurality of electrolyte flow channels between the adjacent first impermeable, substantially metal electrode and second permeable, substantially metal electrode.

23. The flow battery electrode assembly of claim 22, wherein the adjacent first impermeable, substantially metal electrode and second permeable, substantially metal electrode are rectangular shaped and the plurality of electrically conductive spacers extend in a substantially parallel direction to form a plurality of substantially parallel electrolyte flow channels.

24. The flow battery electrode assembly of claim 18, wherein the electrode assembly is located in a central opening in an electrically insulating frame which supports the first impermeable, substantially metal electrode and the second permeable, substantially metal electrodes.

25. The flow battery electrode assembly of claim 24, wherein the frame comprises a disc shaped or polygonal plate shaped frame comprising:

at least a first and a second electrolyte flow manifolds;

a first set of flow channels on a first surface of the frame connecting the first manifold with the central opening;

a second set of flow channels on an opposite, second surface of the frame connecting the second manifold with the central opening.

26. A flow battery comprising:

a vessel;

a stack of electrochemical cells comprising a plurality of the electrode assemblies of claim 18 located in the vessel;

a reservoir located in the vessel, the reservoir configured to accumulate a metal-halide electrolyte; and a flow circuit located in the vessel, the flow circuit configured to deliver the metal-halide electrolyte between the reservoir and the stack of electrochemical cells.

27. The flow battery of claim 26, wherein:

the first impermeable, substantially metal electrode and the second permeable, substantially metal electrode are electrically connected in series to electrically connect in series the electrochemical cells in the stack;

the stack of electrochemical cells comprises a first electrochemical cell and an adjacent second electrochemical cell;

a cathode electrode of the first electrochemical cell comprises the first impermeable, substantially metal electrode;

an anode electrode of the second electrochemical cell comprises the second permeable, substantially metal electrode;

the at least one electrically conductive spacer connects the cathode electrode of the first electrochemical cell to the anode electrode of the second electrochemical cell;

an anode electrode of the first electrochemical cell is separated from the cathode electrode of the first electrochemical cell by a reaction zone of the first electrochemical cell; and a cathode electrode of the second electrochemical cell is separated from the anode electrode of the second electrochemical cell by a reaction zone of the second electrochemical cell.

* * * * *